(12) United States Patent
Lee et al.

(10) Patent No.: US 11,918,131 B2
(45) Date of Patent: Mar. 5, 2024

(54) REFRIGERATOR

(71) Applicant: LG ELECTRONICS INC., Seoul (KR)

(72) Inventors: Seojin Lee, Seoul (KR); Wonjin Lee, Seoul (KR); Insun Yeo, Seoul (KR); Eugene Myung, Seoul (KR); Miyoung Seo, Seoul (KR); Kyukwan Choi, Seoul (KR); Yezo Yun, Seoul (KR); Minkyu Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 395 days.

(21) Appl. No.: 17/433,512

(22) PCT Filed: Feb. 13, 2020

(86) PCT No.: PCT/KR2020/002080
§ 371 (c)(1),
(2) Date: Aug. 24, 2021

(87) PCT Pub. No.: WO2020/175834
PCT Pub. Date: Sep. 3, 2020

(65) Prior Publication Data
US 2022/0151419 A1 May 19, 2022

(30) Foreign Application Priority Data
Feb. 25, 2019 (KR) .................. 10-2019-0021867
Mar. 11, 2019 (KR) .................. 10-2019-0027728

(51) Int. Cl.
*A47G 29/12* (2006.01)
*A47G 29/14* (2006.01)
(Continued)

(52) U.S. Cl.
CPC ............ *A47G 29/141* (2013.01); *F25B 21/02* (2013.01); *F25D 17/062* (2013.01); *F25D 23/10* (2013.01);
(Continued)

(58) Field of Classification Search
CPC ............ A47G 29/141; A47G 2029/145; A47G 2029/147; F25D 17/062; F25D 23/10; F25D 29/005; F25B 21/02
See application file for complete search history.

(56) References Cited

U.S. PATENT DOCUMENTS 5,774,053 A * 6/1998 Porter .................. A47G 29/141
340/568.1
6,079,216 A 6/2000 de Marsillac Plunkett et al.
(Continued)

FOREIGN PATENT DOCUMENTS

CN           1888780 A      1/2007
CN          107084583 A     8/2017
(Continued)

*Primary Examiner* — Marc E Norman
(74) *Attorney, Agent, or Firm* — Bryan Cave Leighton Paisner LLP

(57) ABSTRACT

The present invention relates to a front door refrigerator for enabling a delivery man to safely deliver delivery goods to an orderer even when a user having ordered an item or fresh food is not at home, and preventing the delivery goods from becoming lost during delivery.

26 Claims, 23 Drawing Sheets

(51) Int. Cl.
  *F25B 21/02*  (2006.01)
  *F25D 17/06*  (2006.01)
  *F25D 23/10*  (2006.01)
  *F25D 29/00*  (2006.01)

(52) U.S. Cl.
  CPC ...... *F25D 29/005* (2013.01); *A47G 2029/145* (2013.01); *A47G 2029/147* (2013.01); *F25D 2323/023* (2013.01); *F25D 2700/06* (2013.01)

(56) References Cited

U.S. PATENT DOCUMENTS

| | | | |
|---|---|---|---|
| 6,415,552 B1* | 7/2002 | Khosropour | F25D 23/12 52/27 |
| 6,484,531 B1* | 11/2002 | Hambleton | F25D 23/10 312/286 |
| 6,967,575 B1* | 11/2005 | Dohrmann | G06Q 20/367 340/5.31 |
| 9,554,646 B1* | 1/2017 | Charette | B01L 3/50853 |
| 2007/0193280 A1* | 8/2007 | Tuskiewicz | A47F 3/0404 62/3.6 |
| 2007/0273475 A9 | 11/2007 | Neumann | |
| 2012/0158606 A1* | 6/2012 | Moudy | G06Q 10/083 705/332 |
| 2017/0213187 A1 | 7/2017 | Choi et al. | |
| 2019/0231106 A1* | 8/2019 | Kaiserman | F25D 23/10 |
| 2022/0039581 A1* | 2/2022 | Lee | A47G 29/30 |

FOREIGN PATENT DOCUMENTS

| | | |
|---|---|---|
| CN | 109214742 A | 1/2019 |
| JP | 2006130609 A | 5/2006 |
| JP | 2017067366 A | 4/2017 |
| KR | 20030027327 A | 4/2003 |
| KR | 20110033394 A | 3/2011 |
| KR | 20150064382 A | 6/2015 |
| KR | 20160006474 A | 1/2016 |
| KR | 10-2017-0087705 A | 7/2017 |
| WO | 199741542 A1 | 11/1997 |
| WO | 2016036453 A1 | 3/2016 |

* cited by examiner

REFRIGERATOR

This application is a National Stage Application of International Application No. PCT/KR2020/002080, filed Feb. 13, 2020, which claims the benefit of Korean Patent Application No. 10-2019-0021867, filed Feb. 25, 2019, and Korean Patent Application No. 10-2019-0027728, filed Mar. 11, 2019, the contents of which are all hereby incorporated by reference herein in their entirety.

TECHNICAL FIELD

The present invention relates to a refrigerator installed at an entrance.

BACKGROUND ART

Recently, a delivery service for delivering articles to a predetermined place has been activated. Particularly, when the article is fresh food, a refrigerator or a heating cabinet is provided in the delivery vehicle to prevent the food from being spoiling or getting cold so that the food is stored and delivered.

Also, it is common that food is delivered in a packaging material for maintaining a cold or warm state. The packaging material is made of environmental pollutants such as Styrofoam, thereby creating a social atmosphere to reduce usage.

If the user is at home at the delivery time, the delivery person and the user may face-to-face to receive food, but when the user is not at home or when the delivery time is too early or too late, it is difficult for the delivery person and the user to face-to-face to receive the food.

Therefore, even if the delivery person and the user do not directly face each other, the food may be delivered, and there is a need to not spoil or cool the food until it is finally delivered to the user.

In order to solve this problem, recently, the refrigerator is installed at the entrance (entrance door) at a predetermined place, so that the delivery person keeps the food in the refrigerator to keep the food in a fresh state, and the user may access the refrigerator at a convenient time to receive the food.

In relation to the entrance refrigerator, the prior art has been disclosed as follows.

1. Patent Publication No (Publication Date): 10-2011-0033394 (Mar. 31, 2011)
2. Title of Invention: REFRIGERATOR ATTACHED TO entrance door AND MAIN DOOR According to the prior art document, it is described that a cooling device is provided at a lower portion of the refrigerator, but the detailed configuration of the cooling device is not disclosed at all.

Particularly, the entrance refrigerator may be installed on a door or wall. In order to prevent the refrigerator from falling from the door or the wall, the refrigerator needs not to be too heavy.

However, when the cooling device for generating cold air by driving a refrigerant cycle is applied to the entrance refrigerator, there is a problem in that the weight of the refrigerator becomes too heavy.

In addition, among doors provided in the entrance refrigerator, it is necessary to prevent the door exposed to the outside of the entrance from being opened by a delivery person including a delivery driver or an unspecified person other than the user.

In addition, it is necessary to prevent a phenomenon in which articles stored in the entrance refrigerator are easily stolen by others.

In addition, there is a need to prevent the entrance refrigerator from acting as a means to help opening of the entrance door to criminals, including thieves.

DISCLOSURE OF THE INVENTION

Technical Problem

The present invention is proposed to meet the needs raised above and to improve the raised problems.

In detail, an object of the present invention is to provide an entrance refrigerator, in which food is capable of being kept in a fresh state, and food is capable of being safely delivered to a user.

In addition, an object of the present invention is to provide an entrance refrigerator in which only a delivery person who delivers a corresponding article or food is capable of storing the article in the refrigerator by opening a door of the entrance refrigerator.

In addition, an object of the present invention is to provide an entrance refrigerator in which only the owner of the house or an authorized person opens a door of the entrance refrigerator to take out the articles stored in the refrigerator.

In addition, an object of the present invention is to provide an entrance refrigerator which, when an article stored inside the entrance refrigerator is stolen by an unauthorized person, records a scene of a theft as an image or image to minimize damage caused by the theft of the article.

In addition, an object of the present invention is to provide an entrance refrigerator which is capable of controlling opening or closing of the entrance refrigerator from a distance using a mobile device including a mobile phone and is remotely controllable to check a state of a storage space in the refrigerator.

Technical Solution

A refrigerator according to an embodiment of the present invention for achieving the above objects includes: a cabinet installed to pass through an entrance door or a wall, the cabinet having a storage compartment configured to store an article; an outdoor-side door connected to a front surface of the cabinet to open or close the storage compartment, the outdoor-side door being exposed to an outdoor space; an input portion provided at one side of the door or the cabinet, the input portion being provided to input information therethrough; a controller configured to control the input portion so that, when any set condition is satisfied, the input portion is activated so that the input of the information is enabled, and when another set condition is satisfied, the input portion is inactivated; and a cold air supply device accommodated in the cabinet, the cold air supply device being configured to supply cold air to the storage compartment.

The cold air supply device may include: a thermoelectric element; a cold sink that is in contact with a heat absorption surface of the thermoelectric element; a heat sink that is in contact with a heat generation surface of the thermoelectric element; a cold air circulation fan disposed at a side of the cold sink to allow air of the storage compartment to forcibly flow so that the air of the storage compartment is heat-exchanged with the cold sink; and a heat dissipation fan disposed at a side of the heat sink to allow the indoor air to forcibly flow so that the indoor air is heat-exchanged with the heat sink.

The controller may be configured to control: performance of incoming authentication for releasing a lock state of the outdoor-side door when incoming authentication information inputted through the input portion matches pre-stored incoming reference information, in a state in which the input portion is activated, and performance of any one of deletion, initialization, or reset of the pre-stored reference information when the lock state of the door is released.

Advantageous Effects

According to embodiments, the following effects can be attained.

First, the delivery person may safely deliver delivery articles to the orderer even when the user having the ordered article or fresh food is not at home to prevent the delivery goods from becoming lost during the delivery.

Second, in the case of the delivered article that requires the low temperature storage, such as the fresh food, there may be the advantage in that the delivered article is prevented from being damaged or deteriorated even when the orderer (or user) is absent.

Third, there may be the advantage in that only a person who delivers the article to be delivered, such as the courier opens the door of the entrance refrigerator from the outside of the entrance to prevent the theft of the delivered article from occurring.

Fourth, the situation in which the unauthorized person easily opens the entrance door through the entrance refrigerator may be fundamentally prevented by preventing the other from being opened when either one of the outdoor-side and indoor-side doors of the entrance refrigerator is opened.

In addition, there may be the advantage in that the possibility of the unauthorized person using the weapon to injure the body of the orderer through the storage space of the entrance refrigerator is fundamentally blocked.

Fifth, there may be the advantage in that the door opening or closing of the entrance refrigerator is controlled using the mobile device such as the mobile phone, and the authentication number or password required to open the door of the entrance refrigerator is transmitted to the delivery person.

Sixth, there may be the advantage in that the food stored in the storage compartment of the entrance refrigerator is easily checked using the mobile device such as the mobile phone.

MODE FOR CARRYING OUT THE INVENTION

Figure 1:
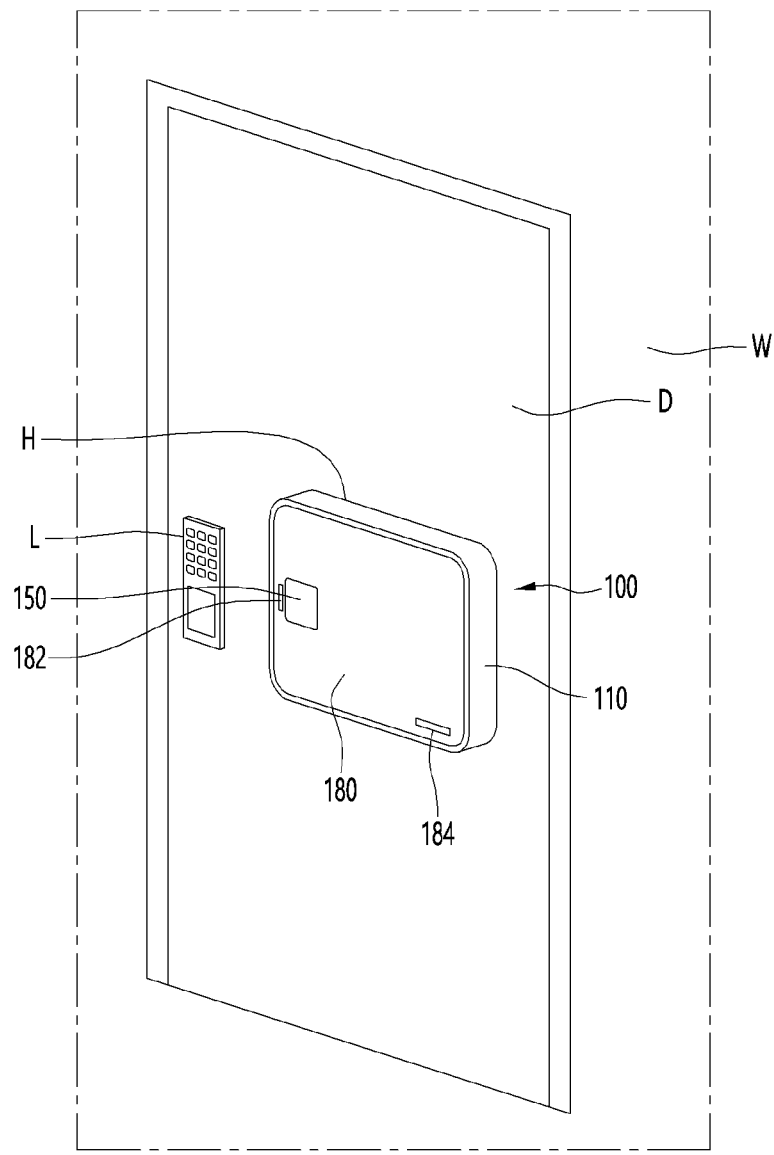
FIG. 1 is a view illustrating a state in which an entrance refrigerator is installed on an entrance door according to an embodiment of the present invention.

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. The terms are merely used to distinguish the corresponding component from other components, and do not delimit an essence, an order or a sequence of the corresponding component. It should be understood that when one component is "connected", "coupled" or "joined" to another component, the former may be directly connected or jointed to the latter or may be "connected", "coupled" or "joined" to the latter with a third component interposed therebetween.

"User" used in this specification means a consumer who purchases an article through the Internet, and should be interpreted as meaning the owner of the entrance refrigerator and his/her family.

In addition, the purchased article or ordered article should be construed to mean all other types of articles, including fresh food.

In addition, a delivery person, such as a courier driver and a postman, should be interpreted as meaning a person who has been given task and authority to deliver the article or goods ordered by the user to the storage compartment of the entrance refrigerator.

The refrigerator of the present invention may be installed to stand upright on the floor of an installation space, fixed to a door of a building, a wall of a building, or a surface of a separate support, or installed to be fixed while passing through the door, wall or support.

It is advantageous to configure a refrigeration cycle that is not heavy so as to reduce damage caused by falling from a place at which the refrigerator is installed. For example, a refrigeration cycle using a small compressor or a refrigeration cycle using a thermoelectric element module may be configured.

Since the thermoelectric element module makes less noise than the compressor, when installing the refrigerator in a space that requires low noise, such as a bedroom, a study room, a living room, a door of a building, or a wall of a building, the refrigeration cycle using the thermoelectric module is advantageous.

The thermoelectric module may be used as a refrigerator or a heating cabinet when compared to the refrigeration cycle using the compressor.

As another example, the entrance refrigerator of the present invention may be used as a simple delivery box in which the thermoelectric module is not installed.

In the present invention, an input portion is provided at one side of the door or the cabinet and also is provided for inputting information. The input portion may include one or more input means or sub-input portions.

In the present invention, the display provided with the input portion may include one or more input portions.

In the present invention, the input portion and the display may be provided separately from each other.

A electronic controller (processor) of the present invention may control at least a portion of the input portion to be in an input activated state when a predetermined condition is satisfied, and to switch at least a portion of the input portion to an input inactive state when another predetermined condition is satisfied.

The controller may control the input portion to be in at least one state of i) all input activation, ii) partial input activation, or iii) all input inactivation.

Here, the input activation state is defined as a state in which information related to the operation of the refrigerator is capable of being input through the input portion, and the input deactivation state is defined as a state in which the information is not capable of being input.

The refrigerator of the present invention may include a cabinet forming a storage compartment, a door for opening or closing the storage compartment, an input portion for inputting information related to the operation of the refrigerator, and a controller.

Also, "the information related to the operation of the refrigerator" is defined as information input through the input portion of the refrigerator. For example, the information includes a command to increase or decrease in notch temperature of the refrigerator, a command to apply or cut off a voltage to an electric element or component of the refrigerator, or a command to increase or decrease in voltage, sensing information detected by a sensor installed in the refrigerator, etc.

The input portion means a means for inputting information related to the operation of the refrigerator, including at least one of the followings.

a. A button for inputting commands related to the operation of the refrigerator.

b. An article information recognizer capable of recognizing unique information about an article, including a code scanner such as a barcode recognizer for recognizing a barcode of the article and a QR code recognizer for recognizing a QR code of the article.

c. A communication module or device that receives a signal from an external device such as a remote controller including a remote controller or a mobile terminal including a mobile phone (e.g., a remote control signal receiver, an NFC signal receiver, etc.).

d. An image capturing portion including a camera for recognizing an image of an object including a person.

e. A microphone that recognizes sound signals, including human speech.

f. A motion signal detector capable of detecting a human motion.

g. A proximity signal detector (or distance signal detector) capable of detecting the proximity of a person.

h. A touch input portion capable of detecting a human touch action.

i. A biometric information detection portion that recognizes biometric information such as human vein information, iris information, or DNA information.

j. A vibration signal detection portion (e.g., a knock signal detection portion) that detects user's knocking on the door of the refrigerator.

k. A timer capable of measuring passage of time.

The refrigerator is provided with a door, and the door may be configured to simultaneously perform functions of a first door (hereinafter, referred to as an "incoming door") that opens or closes a storage compartment for incoming of an article into the refrigerator, and a second door (hereinafter, referred to as an "outgoing door") that opens or closes the storage compartment for outgoing of the article from the refrigerator.

The refrigerator may include a plurality of doors, and the plurality of doors may be configured to include at least the incoming door and the outgoing door. For example, the incoming door may be provided at a front side of the refrigerator, and the outgoing door may be provided at a rear side of the refrigerator.

As another example, both the incoming door and the outgoing door may be provided at the front side or the rear side of the refrigerator.

In this case, it may be understood to mean that both the incoming door and a separate outgoing door that is distinguished from the incoming door are provided at the front side of the refrigerator, and both the incoming door and a separate outgoing door that is distinguished from the incoming door are provided at the rear side of the refrigerator.

The refrigerator includes an input portion, and the input portion may be configured to simultaneously perform function of a first input portion (hereinafter, referred to as an "incoming input portion") for inputting information for incoming of an article into the refrigerator, and a second input portion for inputting information for outgoing of an article (hereinafter, referred to as an "outgoing input portion").

The refrigerator may include a plurality of input portions, and the plurality of input portions may be configured to include at least the input portion for incoming and the input portion for outgoing.

According to the present invention, since a person (e.g., a delivery person) other than the user may put an article in the user's refrigerator, after an article incoming person (delivery person) performs incoming authentication to put the article into the refrigerator, a situation in which the incoming article is taken out by the article incoming person by performing the incoming authentication again may be prevented. Embodiments for solving this problems will be described below.

When the information inputted through the input portion matches set "incoming reference information (=incoming authentication information)", the refrigerator controller performs the incoming authentication in which lock of the door is released, and after the door is unlocked, the "incoming reference information" may be controlled to any one of deletion, initialization, or resetting.

On the other hand, the refrigerator controller may control the refrigerator so that the incoming authentication in which information for incoming is input through the input portion and outgoing authentication in which information for outgoing is inputted through the input portion are performed, and the incoming authentication and the outgoing authentication may be controlled to be performed in different methods. An embodiment of differently controlling the incoming authentication method and the outgoing authentication method includes the following three methods.

First, when the information input by the refrigerator controller for incoming through the input portion matches the set "incoming reference information" (e.g., information related to the article being put), the incoming authentication in which the lock of the door is released may be controlled to be performed, and when the information input for outgoing through the input portion matches the "outgoing reference information set differently from the incoming reference information" (e.g., user information registered in relation to the refrigerator), the outgoing authentication that unlocks the door may be controlled to be performed.

Second, the refrigerator has a plurality of input portions, and an incoming input portion (e.g., an article information recognizer such as a barcode reader or a QR code reader) and an outgoing input portion (e.g., a communication element that receives a signal from an external device such as an NFC signal recognizer) may be provided to be distinguished from each other.

Third, the refrigerator includes an incoming mode (e.g., a storage button) in which information for incoming can be input through the input portion and an incoming mode (e.g., a pickup button) in which information for incoming is capable of being input through the input portion, and when a predetermined condition is satisfied, the controller may control the refrigerator so that only the outgoing mode is activated.

The refrigerator controller may control a method of activating the incoming input portion and a method of activating the outgoing input portion to be different from each other.

For example, when the controller determines that the storage compartment is empty, the incoming input portion may be activated. In addition, when it is determined that the article exists in the storage compartment above a preset reference value, the outgoing input portion may be controlled to be activated.

The presence or absence of the article or an amount of article in the refrigerator may be determined through a camera in the refrigerator. Alternatively, after the incoming authentication is performed, and the door lock is released, it is possible to control the refrigerator so that only the outgoing mode is activated.

When the outgoing mode is selected, the controller may control the refrigerator so that only a pre-registered refrigerator user may perform the outgoing authentication. For example, the controller may guide the user to input a preset password in order to proceed with the outgoing authentication.

The present invention may include at least one of the embodiments described above.

In the present invention, the "incoming mode" or "storage mode" may be defined as a control mode that guides the article incoming person so that the article is stored in the storage compartment, and the "outgoing mode" or "pickup mode" may be defined as a control mode that guides the article outgoing person so that the article is stored in the storage compartment.

Figure 2:
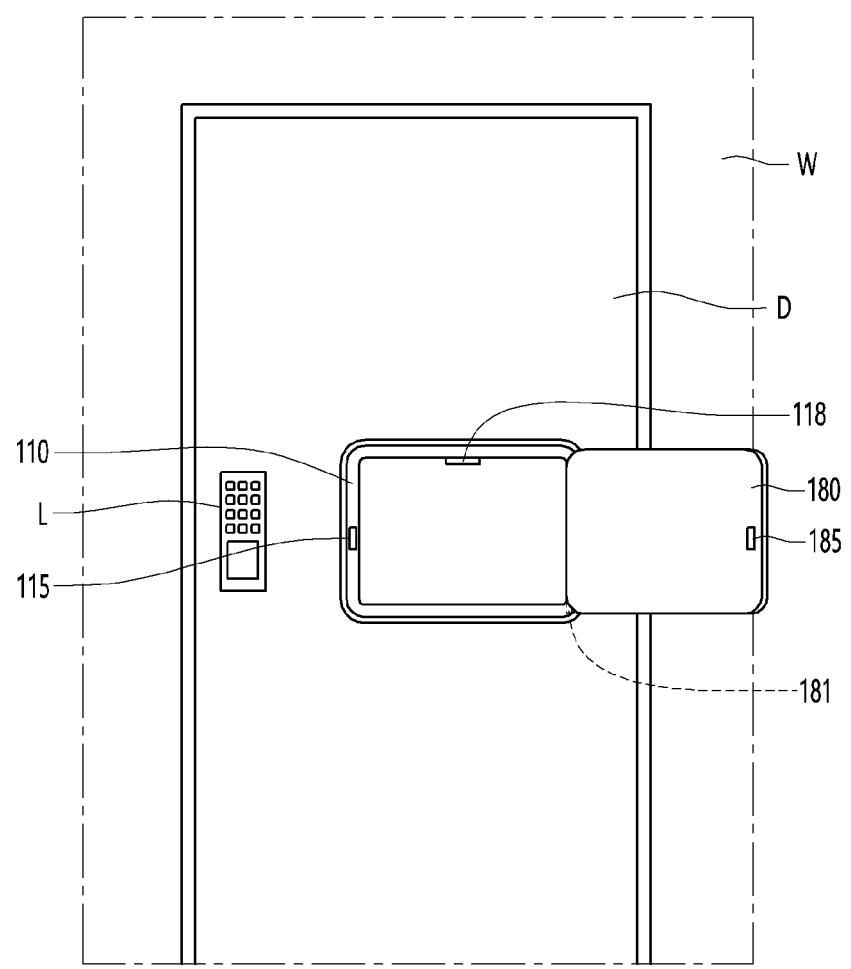
FIG. 2 is a view illustrating a state in which an outer door is opened in the state in which the entrance refrigerator is installed on an entrance door.

FIG. 1 is a view illustrating a state in which an entrance refrigerator is installed on an entrance door according to an embodiment of the present invention, FIG. 2 is a view illustrating a state in which an outer door is opened in the state in which the entrance refrigerator is installed on an entrance door, and FIG., 3 is a schematic view illustrating configurations of an indoor-sider and an outdoor-side based on the door in the state in which the entrance refrigerator is installed on an entrance door.

Figure 3:
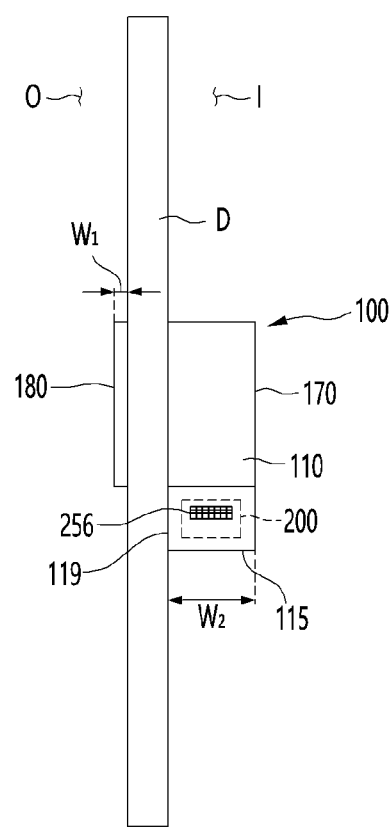
FIG. 3 is a schematic view illustrating configurations of an indoor-sider and an outdoor-side based on the door in the state in which the entrance refrigerator is installed on an entrance door.

Referring to FIGS. 1 to 3, an entrance refrigerator 100 according to an embodiment of the present invention may be installed at an entrance door D of a home or office. The entrance door D is installed on a wall W. Also, a door lock L for opening the door D may be provided.

An opening H is formed in the entrance door D, and the entrance refrigerator 100 may be inserted into the opening H to extend to an indoor-side I and an outdoor-side O. The direction will be defined. With respect to the entrance refrigerator 100, the outdoor-side O is defined as a "front side" and the indoor-side I is defined as a "rear side".

The entrance refrigerator 100 may include a cabinet 110 that forms an outer appearance thereof. For example, the cabinet 110 may have a substantially rectangular parallelepiped shape and be disposed to pass through the opening H. A sealer 160 (see FIG. 6) is provided between the opening H and an outer surface of the cabinet 110 so that the cabinet 110 is in close contact with the opening H.

A storage compartment 110*a* capable of storing food is formed inside the cabinet 110. A camera 118 may be provided in the storage compartment 110*a*. For example, the camera 118 may be disposed above the storage compartment 110*a*. The camera 118 may photograph the food stored in the storage compartment 110*a* and upload the captured image to a delivery application.

For this, the entrance refrigerator may be provided with a communication module capable of communicating with the outside. For example, the communication module may include a Wi-Fi device.

The storage compartment 110*a* may be opened to the indoor-side I and the outdoor-side O.

In detail, the entrance refrigerator 100 is provided on one side (outside) of the storage compartment 110*a* and further includes an outdoor-side door 180 capable of opening or closing the storage compartment 110*a*. The outdoor-side door 180 may be disposed at the outdoor-side O and may be, for example, a door opened by a food delivery person in order to put the food therein. The outdoor-side door 180 may be in a normally locked state to prevent an opening of any door.

The entrance refrigerator 100 is provided on the other side (indoor-side) of the storage compartment 110*a* and further includes an indoor-side door 170 capable of opening or closing the storage compartment 110*a*. The indoor-side door 170 may be disposed at the indoor-side (I) and may be a door opened by a user in order to collect food.

The outdoor-side door 180 and the indoor-side door 170 may be rotatably coupled to the cabinet 110.

The outdoor-side door 180 includes a hinge 181 coupled to the cabinet 110 and a latch 185 hooked to the cabinet 110. The hinge 181 may be provided at one side of both sides of the outdoor-side door 180, and the latch 185 may be provided at the other side of the outdoor-side door 180. In addition, the latch 185 may be provided on a rear surface of the outdoor-side door 180.

A latch coupling portion 115 hooked with the latch 185 may be formed in the cabinet 110 and may be coupled to the latch 185 when the outdoor-side door 180 is closed.

A pressing portion 182 capable of being pressed to open the outdoor-side door 180 is provided on a front surface of the outdoor-side door 180. The pressing portion 182 is disposed in front of the latch 185 to transmit pressing force to the latch 185, and the latch 185 is released from the hook with the latch coupling portion 115 by the transferred the pressing force (push-pull button manner).

Since the configuration of the indoor-side door 170 is similar to that of the outdoor-side door 180, a hinge, a latch, and a pressing portion may also be provided in the indoor-side door 170.

A code reader 184 capable of reading information on delivered food may be provided on a front surface of the outdoor-side door 180. The code reader 184 may include a barcode reader or a QR code reader.

When a food delivery person brings food information (code information) provided on food or a food container to the code reader 184, the entrance refrigerator 100 recognizes that the food is scheduled to be delivered and release the locked state of the outdoor-side door 180. Then, the delivery person may open the outdoor-side door 180 to store the food in the storage compartment 110*a*.

A display portion 150 may be provided on the outdoor-side door 180. Information that is necessary for use of the entrance refrigerator 100 is displayed on the display portion 150.

For example, the display portion 150 may display a "guide comment" for the delivery person. For example, the guide comment may include a comment such as "Please recognize barcode or QR code of food to code reader".

An input portion for inputting a password may be displayed on the display portion 150. The delivery person may release the lock state of the outdoor-side door 180 by inputting the password promised in advance with the user into the input portion.

In summary, the delivery person allows the food code to be recognized to the code reader 184 or inputs a password to unlock the outdoor-side door 180, and thus, after opening the outdoor-side door 180, the food is stored in the storage compartment 110*a*.

The cabinet 110 may extend toward the indoor-side I and the outdoor-side O through the door D. A front-rear width W2 of a portion of the cabinet 110, which extends toward the indoor-side I, may be greater than a front-rear width W1 of a portion, which extends toward the outdoor-side O.

According to such a configuration, since an area protruding from the door D toward the indoor-side I is large, and an area protruding from the door D toward the outdoor-side O is small, an area of the entrance refrigerator 100, which is exposed to a space through which arbitrary people pass, may be reduced. Thus, possibility of damage to the entrance refrigerator 100 may be reduced.

A front surface of the outdoor-side door 180 may form the same plane as the front surface of the entrance door D or may be spaced apart from the front surface of the entrance door D as illustrated in the drawings.

A front support portion 119 supported on an outer surface of the door D is included in a lower portion of the cabinet 110 extending toward the indoor-side I. For example, the front support portion 119 may be attached to the outer surface of the door D.

In addition, a cold air supply device 200 may be provided at the lower portion of the entrance refrigerator 100. Since a front surface of a portion in which the relatively heavy cold air supply device 200 is accommodated, that is, the front support portion 119 is supported or attached to the door D, the entrance refrigerator 100 may be stably mounted on the door D.

Figure 4:
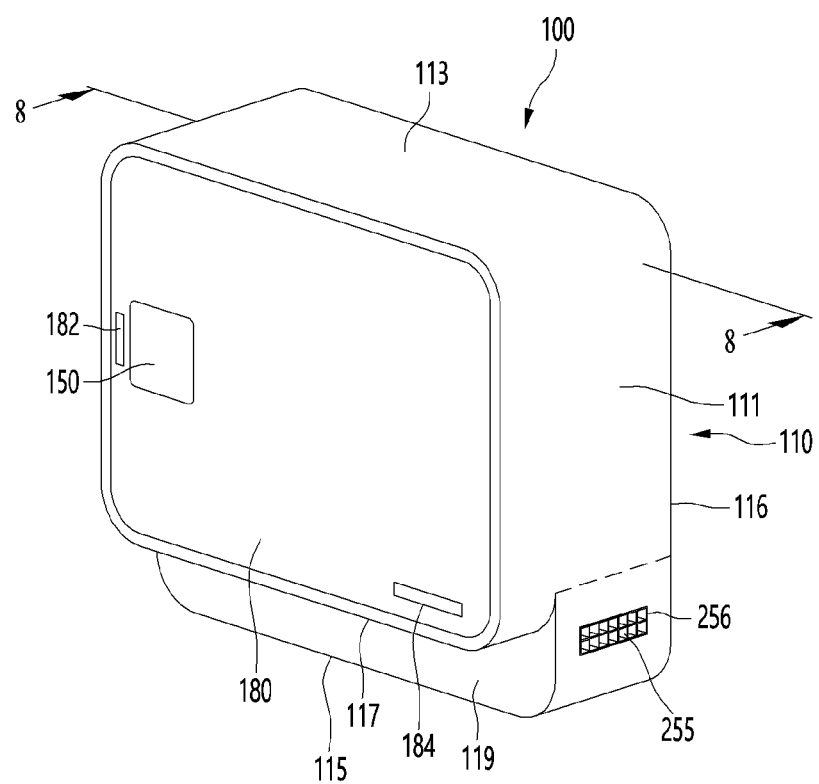
FIG. 4 is a front perspective view illustrating a configuration of the refrigerator according to an embodiment of the present invention.
Figure 5:
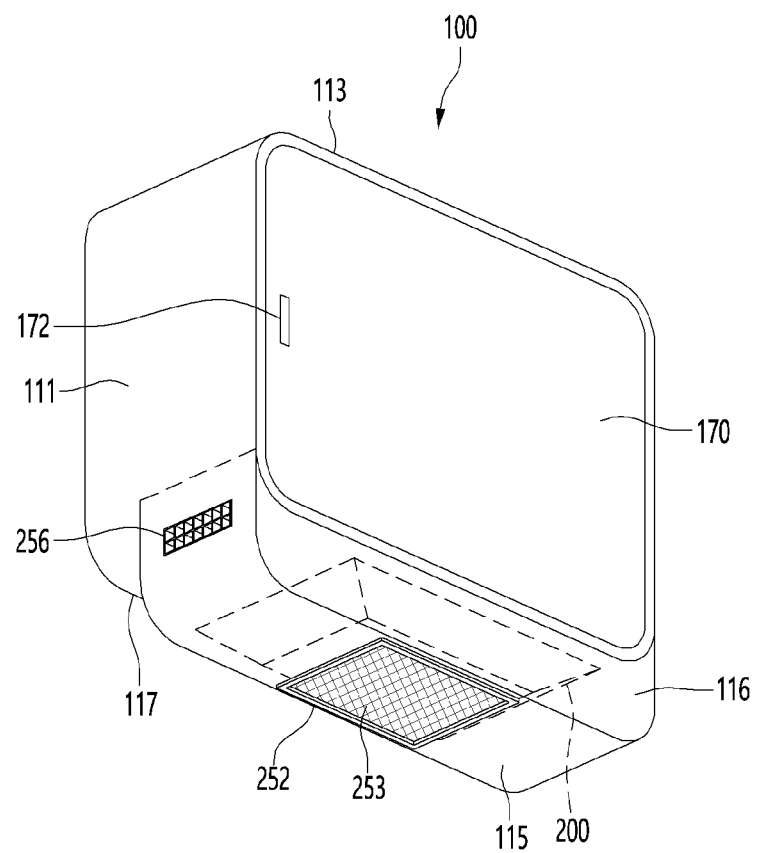
FIG. 5 is a rear perspective view illustrating the configuration of the refrigerator according to an embodiment of the present invention.
Figure 6:
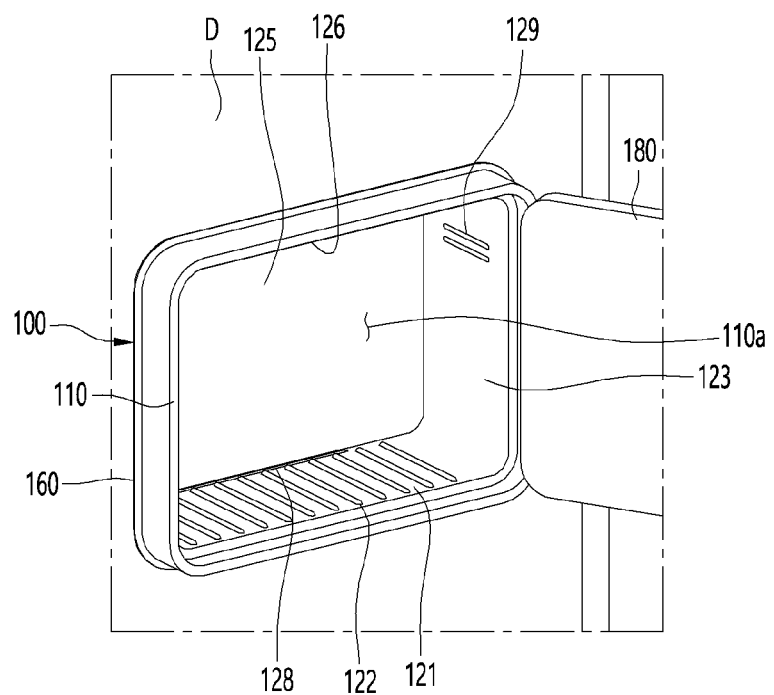
FIG. 6 is a view illustrating a configuration of an inner storage compartment of the entrance refrigerator according to an embodiment of the present invention.

FIG. 4 is a front perspective view illustrating a configuration of the refrigerator according to an embodiment of the present invention, FIG. 5 is a rear perspective view illustrating the configuration of the refrigerator according to an embodiment of the present invention, and FIG. 6 is a view illustrating a configuration of an inner storage compartment of the entrance refrigerator according to an embodiment of the present invention.

Referring to FIGS. 4 to 6, the entrance refrigerator 100 according to an embodiment of the present invention includes a cabinet 110 forming an outer appearance thereof. The cabinet 110 may include two cabinet side surface portions 111, a cabinet top surface portion 113 connecting upper portions of the two cabinet side surface portions 111, a cabinet bottom surface portion 115 forming a bottom surface of the cabinet 110, a cabinet rear surface portion 116 forming a rear surface of the cabinet 110, and a front surface support portion 119 extending upward from a front end of the cabinet bottom surface portion 115 and supported or attached to an outer surface of the door D. A cold air supply device 200 may be disposed at a rear side of the front surface support portion 119.

The cabinet 110 may further include a storage compartment bottom surface portion 117 extending forward from an upper end of the front surface support portion 119 to form a bottom surface of the storage compartment 110a.

According to the configuration of the cabinet 110, the cabinet 110 may be configured to have an "L" shape. In detail, the cabinet 110 may be understood to include a first case forming a storage compartment having a hexahedral shape and a second case formed below the first case. In addition, the second case may be formed to further extend to a downward side of the first case from a point spaced backward from a front end of the first case.

A storage compartment 110a is formed inside the first case, and a heat dissipation space in which the cold air supply device 200 is installed is formed inside the second case. The storage compartment 110a and the heat dissipation space may be partitioned by a partition wall, and the first and second cases may be provided as a single body. The partition wall may be a storage compartment lower wall 121.

A dissipated heat discharge portion 255 through which external air passing through a heat dissipation portion of the cold air supply device 200 is discharged may be formed at a lower portion of the cabinet side surface portion 111, specifically, at any point of the cabinet side surface portion 111 defining a side surface of the second case. The dissipated heat discharge portion 255 may include a discharge grille 256.

An opening may be formed in each of the front and rear surfaces of the cabinet 110, and doors 170 and 180 may be coupled to the openings, respectively.

In detail, the doors 170 and 180 include an outdoor-side door 180 opening or closing an opening formed at an outdoor-side end of the cabinet 110 and an indoor-side door 170 opening or closing an opening formed at an indoor-side end of the cabinet 110.

The outdoor-side door 180 is a door that is capable of being opened from the outside in order for the delivery person to store the delivered article. After inputting a password or recognizing an article, the delivery person may open the outdoor-side door 180 to put food into the storage compartment 110a.

The user may open the indoor-side door 170 to take out the food stored in the storage compartment 110a. The structure of the indoor-side door 170 is similar to that of the outdoor-side door 180. The indoor-side door 170 may be provided with a pressing portion 172 this is capable of being manipulated to open the door. The user may open the indoor-side door 170 by pressing the pressing portion 172. However, since the indoor-side door 170 is a door disposed at the indoor-side and may only be accessed by a user, and thus locking may not be required. Accordingly, an action (password input, article recognition, etc.) for unlocking to open the outdoor-side door 180 may not be required.

A cold air supply device 200 may be provided at the lower portion of the cabinet 100. The cold air supply device 200 may be installed in a space defined by both lower sides of the cabinet side surface portion 111, the cabinet bottom surface portion 115, the front surface support portion 119, and the cabinet rear surface portion 116.

An external air inflow portion 252 for allowing external air to flow into the cold air supplying device 200 is formed in the cabinet bottom surface portion 115. The air suctioned in through the external air inflow portion 252 may be discharged through the dissipated heat discharge portion 255 via a heat dissipation fan 280 and a heat sink 220 of the cold air supply device 200. An inflow grille 253 may be installed in the external air inflow portion 252. It may be understood that the external air inflow portion 252 and the dissipated heat discharge portion 255 are formed in an outer wall of the cabinet 110.

The storage compartment 110a may be defined by an inner wall of the cabinet 110. In detail, the inner wall of the cabinet 110 includes a storage compartment lower wall 121 forming a seating surface on which food is placed, a storage compartment sidewall 123 extending upward from both sides of the storage compartment lower wall 121, a storage compartment upper wall 126 forming a top surface of the storage compartment 110a and connecting an upper portion of the storage compartment sidewall 123, and a storage compartment rear wall 125 connecting a rear portion of the storage compartment sidewall 123.

The storage compartment 110a may be configured to form a substantially hexahedral space by the storage compartment lower wall 121, the storage compartment sidewall 123, the storage compartment upper wall 126, and the storage compartment rear wall 125. The storage compartment sidewall 123 forms one surface of a second passage duct 105 (see FIG. 8).

The storage compartment lower wall 121 may be provided with a rib 122 protruding upward, and the rib 122 may extend forward and backward and be provided in plurality, which are arranged in left and right directions. Food is placed at an upper side of the plurality of ribs 122 to prevent the food from being slid.

A cold air inflow hole 128 for allowing the cold air inside the storage compartment 110a to return to the cold air supply device 200 may be formed in the storage compartment lower wall 121. For example, the cold air inflow hole 128 may be formed at a rear side of the storage compartment lower wall 121.

A cold air discharge hole 129 for supplying the cold air generated by the cold air supply device 200 to a side of the storage compartment 110a may be formed in the storage compartment sidewall 123. The cold air generated in the cold air supply device 200 may be supplied to the side surface portion of the storage compartment 110a by the configurations of the cold air inflow hole 128 and the cold air discharge hole 129, and then be returned to the cold air supply device 200 through a rear lower portion.

A camera 118 capable of photographing food put into the storage compartment 110a may be installed on the upper wall 126 of the storage compartment 110a.

Figure 7:
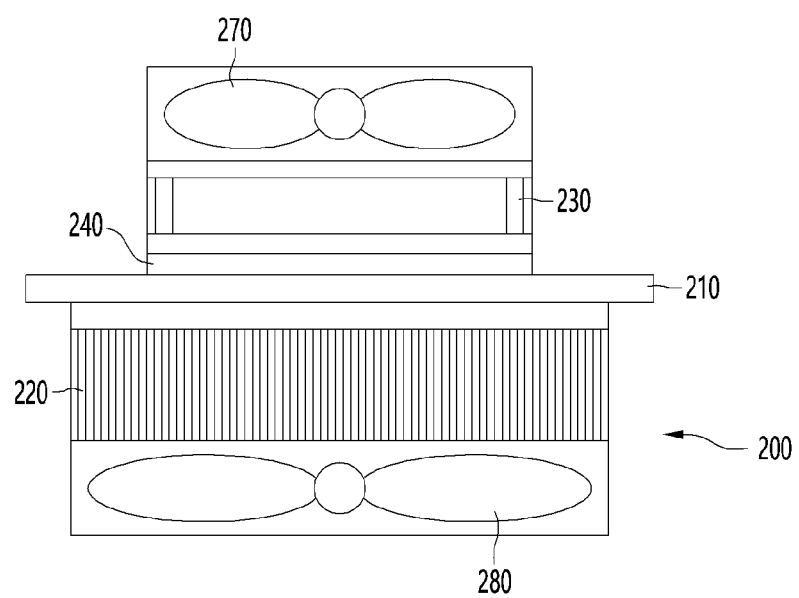
FIG. 7 is a view illustrating a configuration of a cold air supply device according to an embodiment of the present invention.
Figure 8:
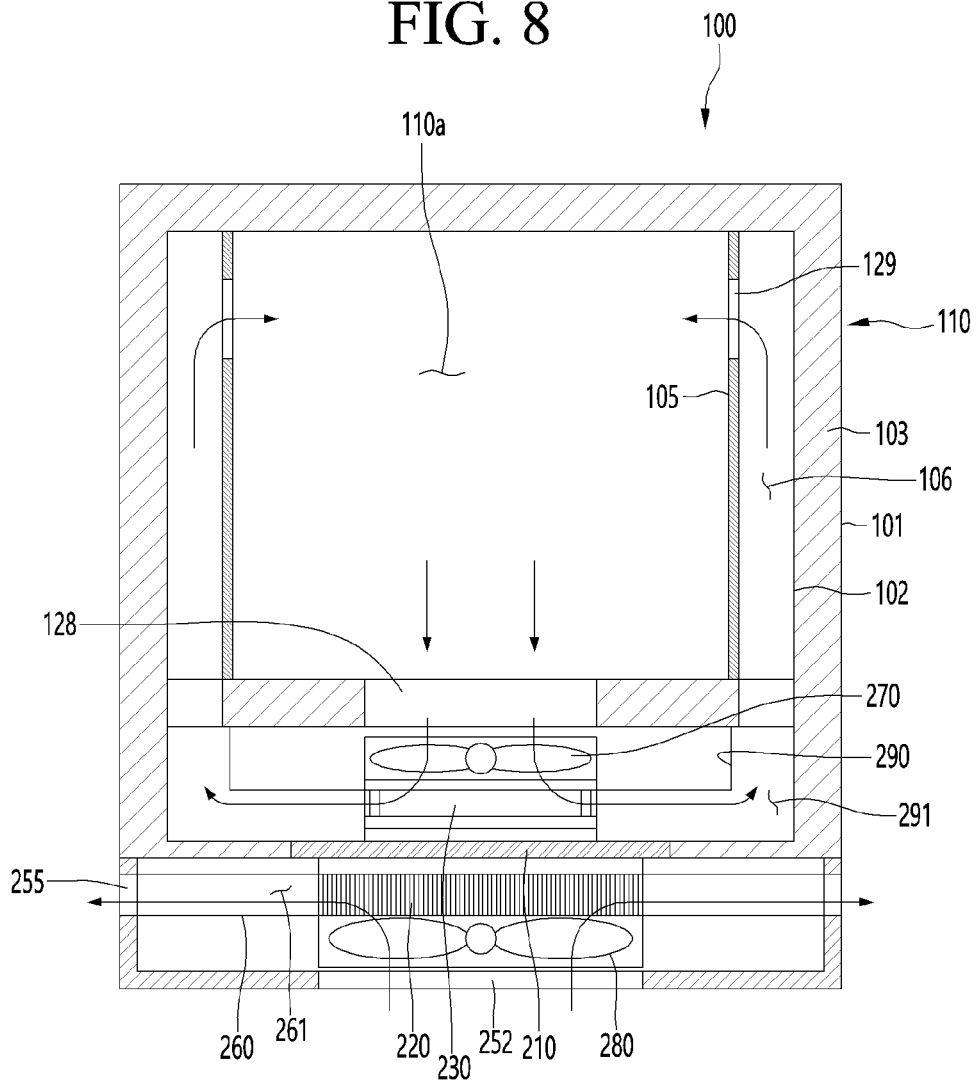
FIG. 8 is a cutaway cross-sectional view taken along line 8-8 of FIG. 4.
Figure 9:
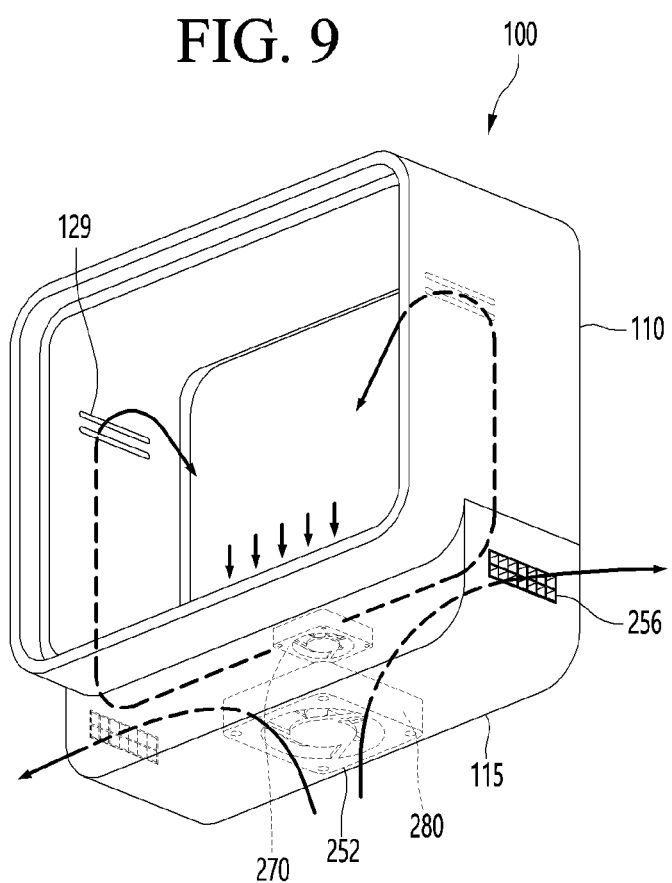
FIG. 9 is a view a state in which a state in which cold air supply and heat dissipation are performed in the entrance refrigerator according to an embodiment of the present invention.

FIG. 7 is a view illustrating a configuration of the cold air supply device according to an embodiment of the present invention, FIG. 8 is a cutaway cross-sectional view taken along line 8-8 of FIG. 4, and FIG. 9 is a view a state in which a state in which cold air supply and heat dissipation are performed in the entrance refrigerator according to an embodiment of the present invention.

Referring to FIGS. 7 to 9, the cold air supply device 200 according to the embodiment of the present invention is installed at the lower portion of the cabinet 100 and is provided at a lower portion of the storage compartment 110a to form a cold air passage and a heat dissipation passage.

The cold air supply device may include a thermoelectric module for generating cold air. Since the entrance refrigerator 100 is not provided with a component for driving a refrigeration cycle, for example, a high noise generation source such as a compressor, and thus, noise generation during the operation of the refrigerator 100 may be reduced.

And, since the thermoelectric module is configured to be relatively lightweight, it is possible to reduce a weight of the entrance refrigerator 100, which needs to be stably installed on the entrance door D.

The thermoelectric module 200 includes a thermoelectric element, and the thermoelectric element refers to an element that implements cooling and heat generation using a Peltier effect. When a heat absorption-side of the thermoelectric element is disposed to face the storage compartment 110a, and a heat generation-side of the thermoelectric element is disposed to face the lower portion of the refrigerator 100, the storage compartment 110a may be cooled through an operation of the thermoelectric element.

In detail, the thermoelectric module 200 includes a module body 210 to which the thermoelectric element is coupled and which has a rectangular plate shape, a cold sink 230 provided at one side of the module body 210 to be heat-exchanged with the cold air of the storage compartment 110a, and a heat sink 220 provided at the other side of the module body 210 to be heat-exchanged with external air.

The one side of the module body 210 is a direction toward the storage compartment 110, that is, an upper side with respect to the thermoelectric module 200, and the other side is a direction toward the outside of the refrigerator 100, that is, a lower side.

The cold sink 230 is disposed to be in contact with the heat absorption portion of the thermoelectric element, and the heat sink 220 is disposed to be in contact with the heat generation portion of the thermoelectric element. The heat absorption portion and the heat generation portion of the thermoelectric element may have shapes that are in surface contact with each other to form opposite surfaces.

In the thermoelectric module 200, heat has to be rapidly dissipated from the heat generation portion of the thermoelectric element, so that the heat is sufficiently absorbed into the heat absorption portion of the thermoelectric element. Thus, a heat exchange area of the heat sink 220 may be larger than a heat exchange area of the cold sink 230.

Each of the heat sink 220 and the cold sink 230 may include a base that is in contact with the thermoelectric element and a heat exchange fin coupled to the base.

The thermoelectric module 200 may further include a module insulator 240 installed between the cold sink 230 and the heat sink 220. For example, the module insulator 240 may have a quadrangular frame shape and may be disposed to surround an edge of the thermoelectric element.

A cold air circulation fan 270 may be installed at an upper side of the thermoelectric module 200 to face the storage compartment 110a so as to forcibly circulate the cold air in the storage compartment 110a. The cold air circulation fan 270 may be disposed above the cold sink 230. Also, for example, the cold air circulation fan 270 may include a centrifugal fan that suctions cold air in an axial direction and discharges the cold air in a radial direction.

The cabinet 110 includes an outer case 101 that forms an outer appearance of the entrance refrigerator 100, an inner case 101 that is inserted into the outer case 101 to form at least a portion of the inner wall of the storage compartment, and an insulator 103 provided between the outer case 101 and the inner case 101.

A first passage duct 290 extending from the cold sink 230 to guide a flow of the cold air is provided inside the cabinet 110.

The first passage duct 290 may be configured to extend laterally from both sides of the cold sink 230 and then extend upward. A first cold air passage 291 may be formed inside the first passage duct 290. In addition, the first passage duct 290 may be connected to a second passage duct 105.

The second passage duct 105 is provided on each of both sides of the inner case 101. The second passage duct 105 forms the storage compartment sidewall 123, and the cold air discharge hole 129 is formed at an upper portion of the second passage duct 105.

A second cold air passage 106 through which the cold air flows is formed between each of both side surfaces of the inner case 101 and the second passage duct 105. The second cold air passage 106 may extend upward from the first cold air passage 291.

When the cold air circulation fan 270 is driven, the cold air in the storage compartment 110a flows in the axial direction of the cold air circulation fan 270 through the cold air inflow hole 128, and then is heat-exchanged with the cold sink 230 so as to be cooled. Then, the cooled cold air flows to both sides in the radial direction of the cold air circulation fan 270 and is introduced into the first cold air passage 291.

The cold air flowing along the first cold air passage 291 may flow upward to flow into the second cold air passage 106 and then be discharged to both the sides of the storage compartment 110a through the cold air discharge hole 129.

The thermoelectric module 200 may further include a heat dissipation fan 280 that introduces external air (indoor air) to be heat-exchanged with the heat dissipation portion of the thermoelectric device. The heat dissipation fan 280 is supported on the cabinet bottom surface portion 115 and be disposed above the external air inflow portion 252. For example, the heat dissipation fan 280 may include a centrifugal fan that suctions the cold air in the axial direction and discharges the cold air in the radial direction.

A heat dissipation passage duct 260 extending from the heat sink 220 to guide a flow of external air and forming a heat dissipation passage 261 therein may be provided in the cabinet 110. The heat dissipation passage duct 260 may extend laterally from both sides of the heat sink 220 and be connected to the dissipated heat discharge portion 255.

When the heat dissipation fan 278 is driven, the external air is introduced in the axial direction of the heat dissipation fan 280 through the external air inflow portion 252 and then is heat-exchanged with the heat sink 220 so as to be heated. In addition, the heated cool air may flow in the radial direction of the heat dissipation fan 270 and may be discharged from the dissipated heat discharge portion 255 to the outside of the refrigerator through the heat dissipation passage duct 260.

As power to be supplied to the entrance refrigerator 100, power to be supplied to an intercom or a doorbell installed around the door D, or an indoor-side lighting source may be used.

Figure 10:
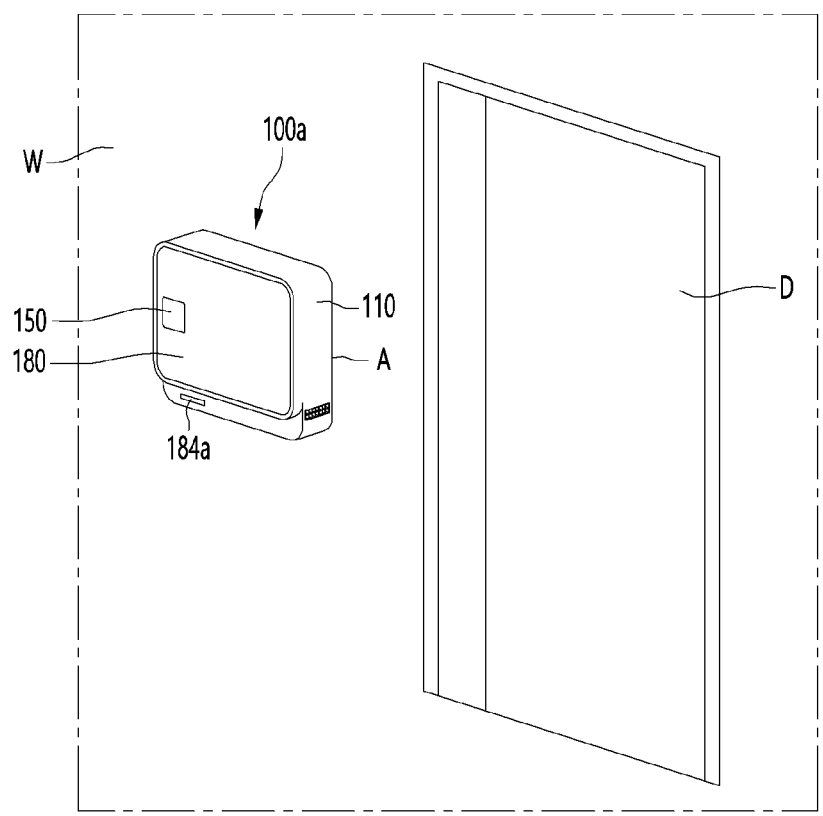
FIG. 10 is a view illustrating a state in which the entrance refrigerator is installed on a wall of an entrance according to an embodiment of the present invention.

FIG. 10 is a view illustrating a state in which the entrance refrigerator is installed on a wall of an entrance according to an embodiment of the present invention.

Referring to FIG. 10, an entrance refrigerator 100a according to an embodiment of the present invention may be installed on an entrance wall W. For example, the entrance refrigerator 100a may be attached to the wall W. That is, a rear surface of the entrance refrigerator 100a is attached to the wall W, and when compared to the refrigerator to be installed on the door, which is described in FIG. 1, the indoor-side door 170 may not be provided. A rear surface of the entrance refrigerator 100a may form an attachment surface A.

Therefore, both a delivery person and a user may access the storage compartment of the cabinet using the outdoor-side door 180.

Since a configuration of a cabinet provided in the entrance refrigerator 100*a* is similar to the cabinet 110 of the entrance refrigerator 100 described with reference to FIG. 1, the description will be cited from those of FIGS. 1 to 3.

A code reader 184*a* may be provided at a lower portion of a front surface of the refrigerator 100*a*. The position of the code reader 184*a* is different from the installation position of the code reader 184 described in FIG. 1. However, description of a function and operation of the code reader 184*a* will be cited from the description of the code reader 184 described in FIG. 1.

Figure 11:
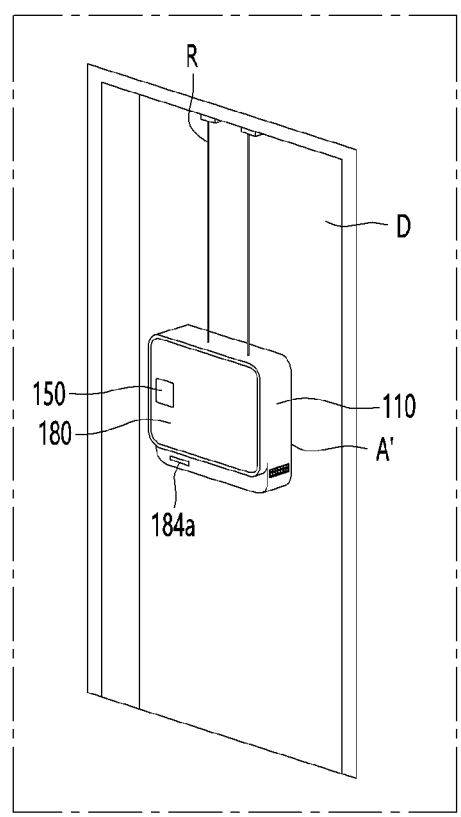
FIG. 11 is a view illustrating a state in which the entrance refrigerator is hung on the entrance door by a wire according to an embodiment of the present invention.

FIG. 11 is a view illustrating a state in which the entrance refrigerator is hung on the entrance door by a wire according to an embodiment of the present invention.

Referring to FIG. 11, an entrance refrigerator 100*b* according to an embodiment of the present invention is attached to a front surface of the door D and may be supported by a wire R. A rear surface of the refrigerator 100*b* may form an attachment surface A'.

The wire R may be attached to an upper portion of the door D to extend downward and may be connected to an upper end of the refrigerator 100*b*. A configuration of the refrigerator 100*b* itself is the same as that of the refrigerator 100*a* described with reference to FIG. 10, and thus, the description of FIG. 10 is cited.

Figure 12:
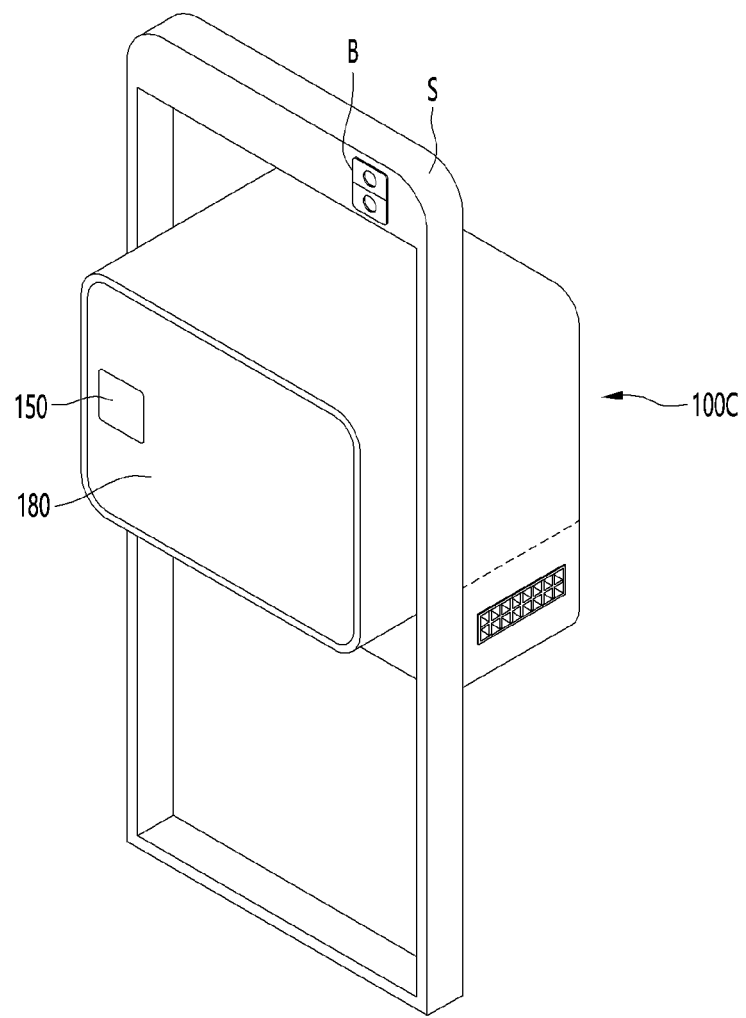
FIG. 12 is a view illustrating a state in which the entrance refrigerator is mounted on a stand according to an embodiment of the present invention.

FIG. 12 is a view illustrating a state in which the entrance refrigerator is mounted on a stand according to an embodiment of the present invention.

Referring to FIG. 12, an entrance refrigerator 100*c* according to an embodiment of the present invention may be configured to be supported by a stand S. The stand S may be configured to have a shape of a substantially rectangular frame and to be erected. As an example, the stand S may be installed around an entrance door D or around an entrance wall W.

In addition, a doorbell B may be installed on the stand S, and a portion of power supplied to the doorbell B may be transferred to the entrance refrigerator 100*c* and used. The description of a configuration of the entrance refrigerator 100*c* itself is cited from the description of the refrigerator described in FIGS. 10 and 11.

Figure 13:
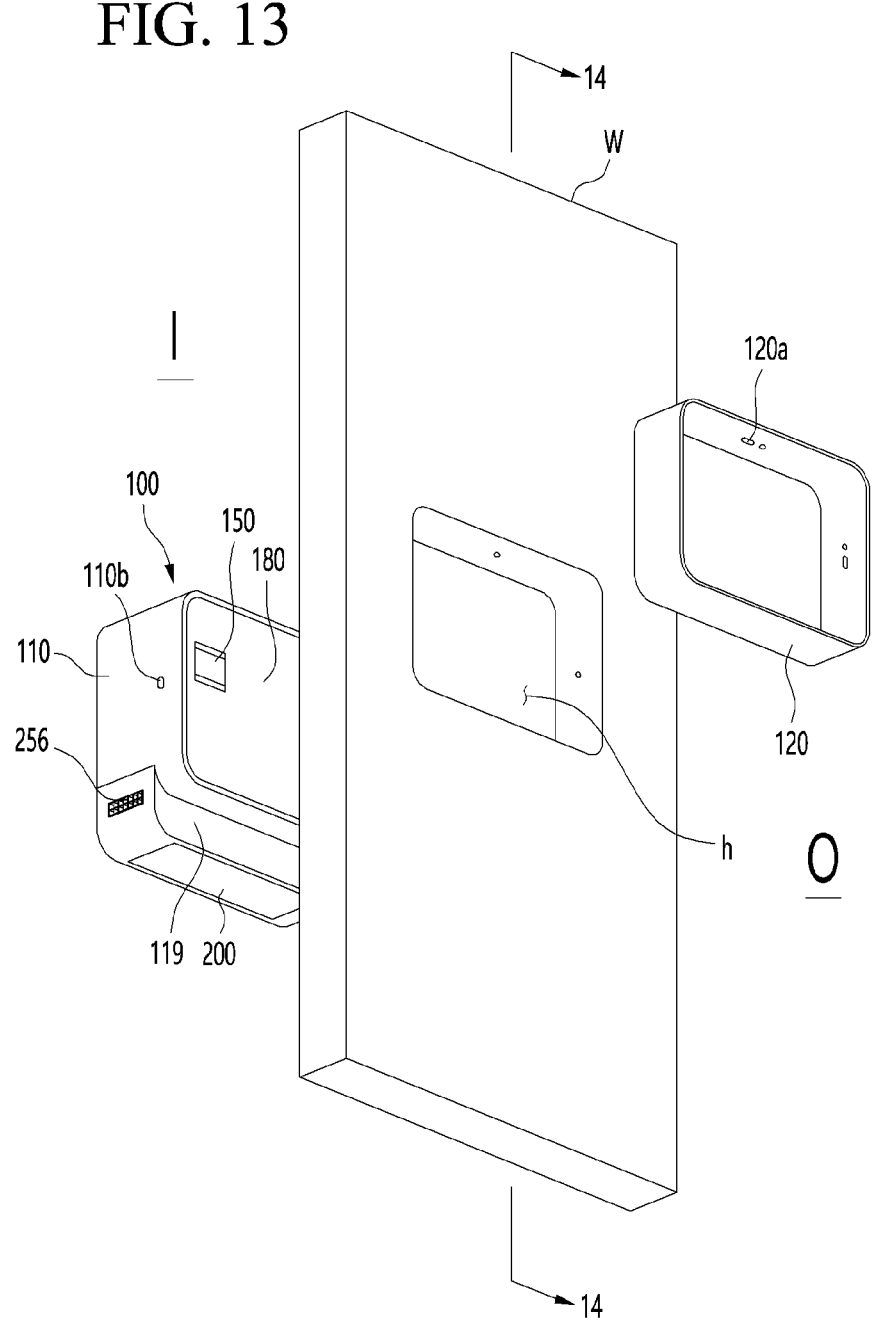
FIG. 13 is an exploded perspective view illustrating a structure in which the entrance refrigerator is buried in the wall according to an embodiment of the present invention.
Figure 14:
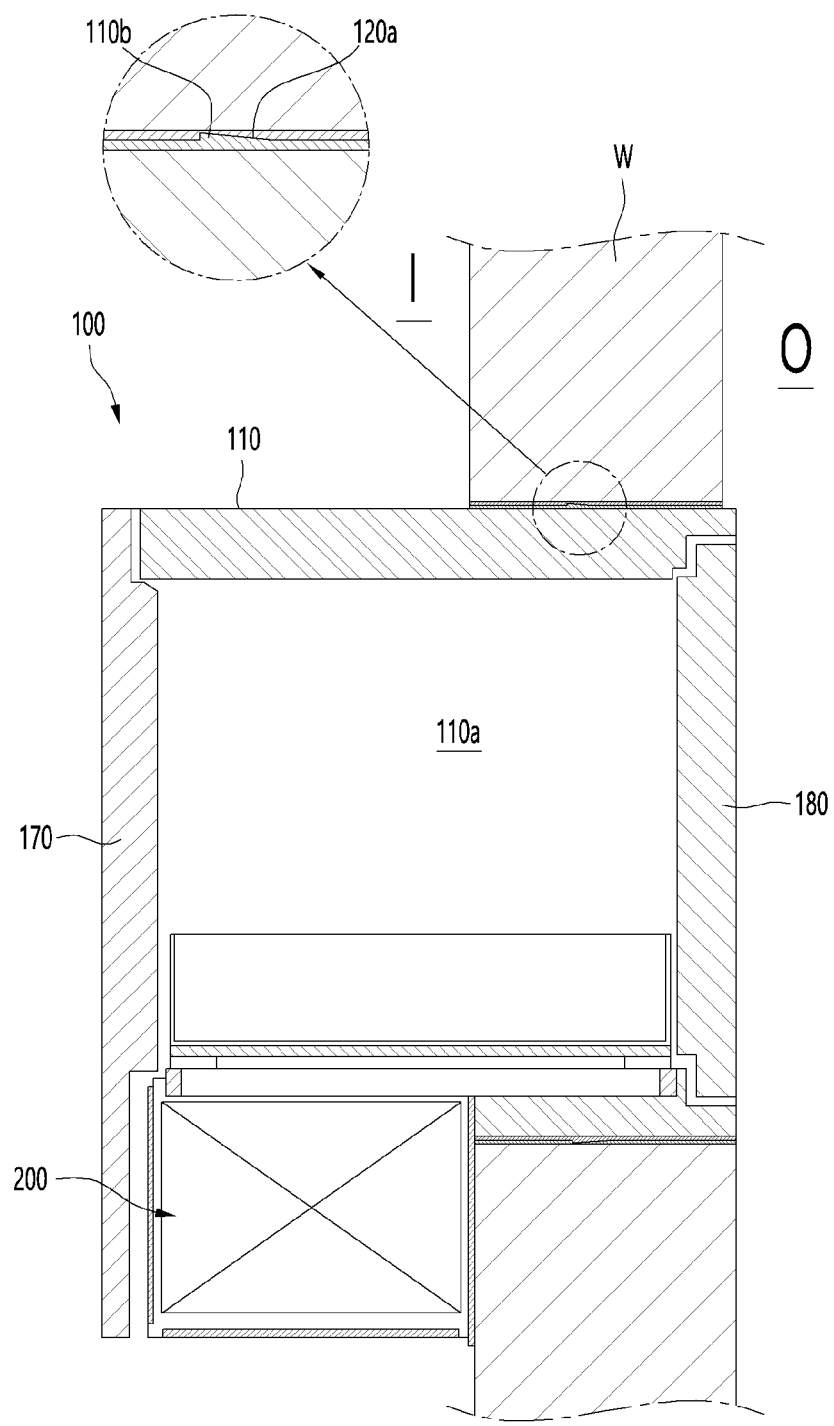
FIG. 14 is a cross-sectional view taken along line 14-14 of FIG. 13.

FIG. 13 is an exploded perspective view illustrating a structure in which the entrance refrigerator is buried in the wall according to an embodiment of the present invention, and FIG. 14 is a cross-sectional view taken along line 14-14 of FIG. 13.

Referring to FIGS. 13 and 14, an entrance refrigerator 100 according to an embodiment of the present invention may be mounted to pass through a wall as illustrated in FIG. 10.

However, in this embodiment, unlike the embodiment illustrated in FIG. 10, there is a difference in that a front surface of the entrance refrigerator 100 protrudes more toward an indoor-side than an outdoor-side.

In other words, a front surface support portion 119 of a cabinet 110 is not exposed to the outdoor-side O, but is in close contact with an indoor-side wall. As described above, a length of the outdoor-side door 180 protruding from the outdoor-side surface of the wall W may be minimized so that the entrance refrigerator 100 is installed so as not to cause inconvenience to pedestrians.

Therefore, according to the present embodiment, a sensor device or code scanner installed on the front surface support portion 119 should be installed at one front side of the outdoor-side door 180.

In addition, the entrance refrigerator 100 according to an embodiment of the present invention may include a bracket 120 that surround top and bottom surfaces and left and right surfaces of the cabinet 110 buried in the wall W.

An opening h is formed in the wall W, and the cabinet 110 is inserted into the opening h. The bracket 120 is closely fixed to an edge of the opening h, and a portion of an outer circumferential surface of the cabinet 110 is fixed to the bracket 120.

In detail, a coupling protrusion may be formed at one side of an outer circumferential surface of the cabinet 110 and an inner circumferential surface of the bracket 120, and a coupling groove through which the coupling protrusion is inserted may be formed on the other side.

In this embodiment, the coupling protrusion 110*b* protrudes from the outer circumferential surface of the cabinet 110, and the coupling groove 120*a* is formed in the inner circumferential surface of the bracket 120.

The installation sequence of the entrance refrigerator 100 is as follows.

First, the bracket 120 is inserted into and fixed to the opening h of the wall W. Thereafter, the cabinet 110 horizontally moves from an indoor-side I to an outdoor-side O and inserted into the bracket 120. Then, the coupling protrusion 110*b* is inserted into the coupling groove 120*a*. Here, the coupling protrusion 110*b* is made of an elastically deformable material, so that the coupling protrusion 110*b* is not damaged while being slid along the inner circumferential surface of the bracket 120 until the coupling protrusion 110*b* is inserted into the coupling groove 120*a*.

Figure 15:
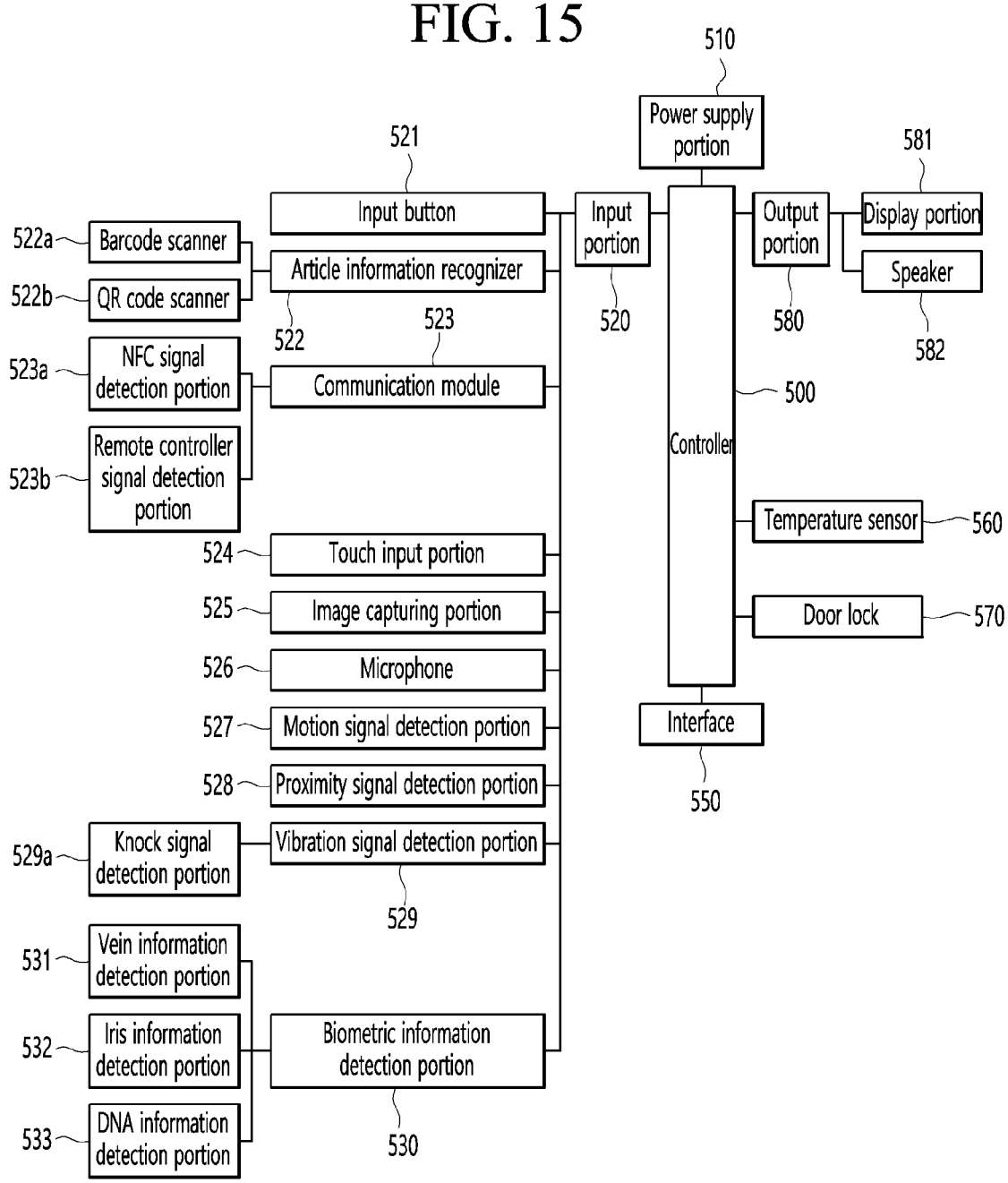
FIG. 15 is a block diagram illustrating a control configuration of the entrance refrigerator according to an embodiment of the present invention.

FIG. 15 is a block diagram illustrating a control configuration of the entrance refrigerator according to an embodiment of the present invention.

Referring to FIG. 15, the entrance refrigerator 100 according to an embodiment of the present invention includes an electronic controller (processor) 500, a power supply portion 510, an input portion 520, an output portion 580, a temperature sensor 560, a door lock 570, and an interface 550.

In detail, the input portion 520 includes a means for allowing a user or a delivery person including a delivery driver to input various information into the controller 500.

For example, the input portion 520 includes at least one or more of an input button 521, an article information recognizer 522, a communication module 523, a touch input portion 524, an image capturing portion 525, a microphone 526, a motion signal detection portion 527, a proximity signal detection portion 528, a vibration signal detection portion 529, and a biometric information detection portion 530.

The input button 521 may include a mechanical button installed around a display portion 180 of the entrance refrigerator 100 and manipulated by the user or the delivery person by applying a predetermined pressure with a finger thereof. The input button 521 may include an input switch or a pressure sensor using a piezo sensor.

The input button 521 may be installed at one side of the cabinet 110 as well as the outdoor-side door 180.

The article information recognizer 522 may include any one or both of a barcode scanner 522*a* for recognizing a barcode printed or attached to a packaging box of a product and a QR code scanner 522*b* for recognizing a QR code.

The communication module 523 may include an NFC signal detection portion 523*a* for recognizing a signal transmitted from a near field communication (NFC) module built in a user's mobile phone and a remote controller signal detection portion 523*b* for recognizing a signal transmitted from the remote control.

The touch input portion 524 may include a touch screen displayed on a screen of the display portion 150. The touch input portion 524 may include a capacitive touch button that detects an input signal by detecting a change in capacitance, which occurs when a user's finger approaches or touches the screen.

The image capturing portion 525 may include an image analysis camera provided at one front side of the outdoor-side door 180 to capture a facial image of the user or delivery person or a camera for recognizing a user's fingerprint in addition to a camera 118 mounted inside the storage compartment 110a.

The proximity signal detector 528 may include an infrared sensor (IR sensor) including an infrared transmitter and receiver.

The vibration signal detection portion 529 may include a knock signal detection portion 529a that detects vibration or sound waves generated when the user knocks the display portion 150 by hands thereof.

In addition, the biometric information detection portion 530 includes at least one of a vein information detection portion 531 detecting a user's vein map, an iris information detection portion 532 detecting a user's iris, or a DNA information detection portion 533 recognizing user's genetic information.

Also, the output portion 580 may include a display portion 581 on which an image or video information is output. The display portion 581 means a display portion 150 (see FIG. 1) provided on the outdoor-side door 180.

In addition, the output portion 580 may further include a speaker 582 for outputting various alarm sounds, multimedia playback sounds, or guide sounds. The speaker may be described as an example of a sound output portion.

The door lock 570 may include a door lock means including the above-described latch 158. The door lock 570 is provided to prevent the indoor-side door 170 or the outdoor-side door 180 from being arbitrarily opened or prevent the outdoor-side door 180 form being opened by an unauthorized person.

The temperature sensor 534 is installed in the storage compartment 110a to detect a temperature of the storage compartment 110a.

In addition, the entrance refrigerator 100 may further include the interface 550, and the interface 550 functions as a passage for connecting various external devices. As an example, the interface 550 may include a wired/wireless data port to which a data storage device including a USB or an SD card is connected.

Figure 16:
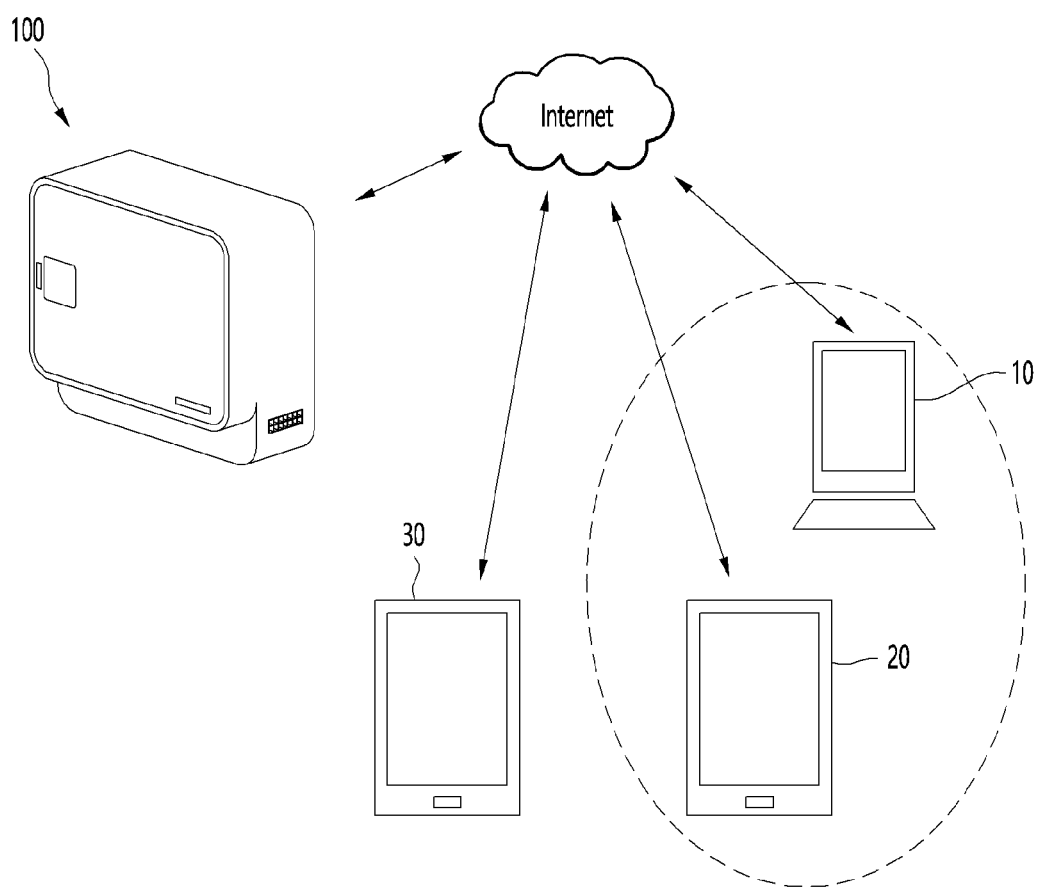
FIG. 16 is a network system configured to connect the entrance refrigerator to a user's terminal according to an embodiment of the present invention.

FIG. 16 is a network system configured to connect the entrance refrigerator to a user's terminal according to an embodiment of the present invention.

Referring to FIG. 16, the entrance refrigerator 100 according to an embodiment of the present invention is communicatively connected to a terminal of the user or delivery person through the Internet.

In detail, the user's terminal may include a computer 10 or a mobile device 20. The delivery person's terminal 30 may include a mobile device or a PDA terminal.

When the user accesses the Internet using the computer 10 or the mobile device 20 to purchase an article at a shopping mall connected to the Internet, information on the purchased article and/or authentication-related information is transmitted to the controller 100 of the entrance refrigerator 100 and then is stored in a memory or a separate server connected to the controller.

At the same time, the information and/or authentication-related information on the purchased article may be transmitted to the server of a courier company and transmitted to the delivery person's terminal 30. The Information on the purchased article may be transmitted to the delivery company server in the form of an encryption code, for example, a barcode or QR code, and the delivery company may attach the encryption code to a packaging box of the purchased product.

In addition, the authentication-related information may be transmitted to the server of the delivery company together with the information on the purchased article and then finally transmitted to the delivery person's terminal 30 or may be transmitted to the user who purchased the article.

Alternatively, at least one or all of the encryption code and authentication-related information may be directly generated by the user. If the user directly generates the encryption code and/or authentication-related information, when the user receives a number of the delivery person's terminal 30 from the courier company, the encryption code and authentication-related information and/or authentication-related information may be directly transmitted to the delivery person's terminal 30.

Hereinafter, a method of using the entrance refrigerator 100 according to an embodiment of the present invention will be described in detail through a flowchart.

Figure 17:
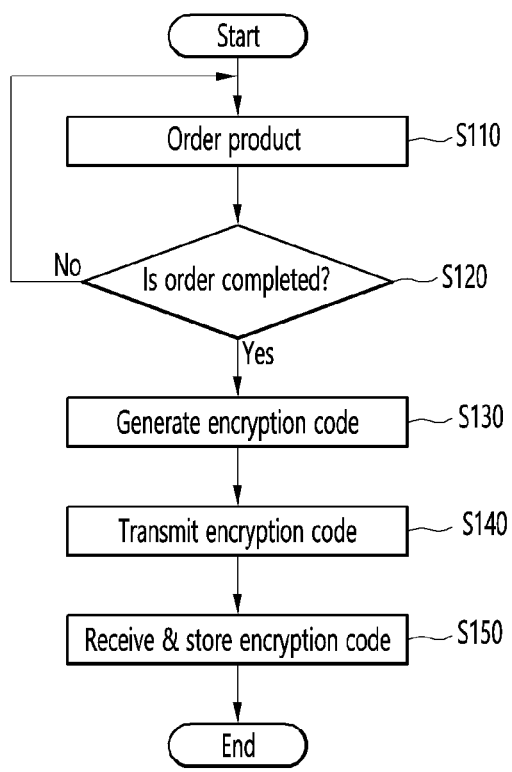
FIG. 17 is a flowchart for schematically explaining a process in which a user orders goods through the Internet, and goods information is stored in the entrance refrigerator.

FIG. 17 is a flowchart for schematically explaining a process in which a user orders goods through the Internet, and goods information is stored in the entrance refrigerator.

Referring to FIG. 17, a user may access the Internet through the computer 10 or the mobile device 20 and may access or log in to a shopping mall site or a mart site for selling goods.

When the user accesses the Internet using the mobile device 20, the user may access or log in to the shopping mall or the mart site through a specific application installed in the mobile device.

The specific application is a means for connecting the controller 500 of the entrance refrigerator 100 according to an embodiment of the present invention to the user's mobile device 20 and the delivery person's terminal 30 to share the information and authentication information with each other.

Here, since the terminal 30 of the delivery person is controlled by a server of the delivery company or the post office, the terminal 30 of the delivery person may be interpreted as the same meaning as the server of the delivery company or the post office.

The user accesses the Internet through the application installed on the computer or terminal to access or log in to an on-line mall or on-line mart that sells products to be purchased and then orders a desired product (or article) (S110).

When the user selects any one of the cash transfer or card payment method and then ends the payment process, it is assumed that the order is completed (S120), and when the order is completed, an encryption code generation process is performed (S130).

Here, it is also possible to generate authentication information together with encryption code generation. The authentication information may be used as an auxiliary means to be used when a process in which the delivery person recognizes the encryption code through the code scanner 595 is not normally performed.

In detail, if a sticker on which the encryption code is printed is torn, or the packaging box is damaged during the delivery of the product, the code scanner 595 may not normally recognize the encryption code. In this situation, the delivery person may directly input the authentication information through the input portion 520 provided on the entrance refrigerator 100, specifically, the input button 591 or the touch input portion 594. The authentication information may be a combination of a plurality of numbers or a combination of a plurality of numbers and letters.

When the order is completed, the server of the on-line mall that sells the corresponding product may automatically generate an encryption code (e.g., barcode or QR code) including information about the corresponding product.

When the encryption code and the authentication information are generated, a process (S140) of transmitting the generated encryption code and authentication information and a process (S150) of receiving and storing the transmitted encryption code and authentication information are performed.

In detail, if the on-line mall or on-line mart is a company that directly produces, packages, and sells the product, all the generation and storage process of the encryption code and authentication information may be performed on the server of the on-line mall or on-line mart.

In this case, the encryption code and authentication information may be transmitted from the on-line mall or on-line mart to a server of a delivery subject (e.g., the courier company or the post office). Then, the delivery subject receiving the authentication information may transmit the authentication information to the terminal 30 of the delivery person who delivers the product.

However, in the case in which the on-line mall or on-line mart is an intermediate linker that connects the products of the producers who produce the purchased products to the consumers, that is, a sales agency, the encryption code and authentication information automatically generated by the server of the sales agency may be transmitted to the packaging subject, i.e., the producer or the packaging company.

Here, the generated encryption code may be printed on a surface of the packaging box by the packaging subject or may be attached to the surface of the packaging box in the form of a sticker. The authentication information may be transmitted by the packaging subject to the server of the delivery subject.

In addition, the authentication information automatically generated by the server of the sales agency may be transmitted directly to the delivery subject promised in advance to deliver the product in addition to a method for collectively transmitting the authentication information to the server of the packaging subject together with the encryption code.

As another example, the encryption code and authentication information may be directly generated by the user, that is, the consumer who has ordered a product. In detail, in the server of the on-line mall or on-line mart, when the user completes the payment for the purchased product, a screen for generating the encryption code and authentication information is displayed on the user's computer or terminal screen, so that the user directly generate uses the encryption code and authentication information.

In more detail, when the user directly completes an operation of generating the encryption code and authentication information, the generated encryption code and authentication information are transmitted to and stored in the controller 500 of the entrance refrigerator 100, the user's computer 10, or user's mobile device 20.

In addition, when the delivery person who delivers the purchased product is finally determined, and the delivery person's information, that is, the name of the delivery person and the number of the terminal 30 are transmitted to the user's mobile device 20, the user may directly transmit the generated encryption code and authentication information to the terminal 30 of the delivery person.

Here, the encryption code may be more convenient to be printed on the packaging box of the product or attached in the form of the sticker. Therefore, when the subject that packages the product and the subject that delivers the product are different, the encryption code may be transmitted to the packaging subject that directly packages the product, that is, the seller or producer, and only the authentication information may be transmitted to the delivery subject, that is, the delivery person's mobile terminal 30.

As another method, when the order for the product is completed, the encryption code may be automatically generated by the server of the corresponding on-line mall or on-line mart and transmitted to the entrance refrigerator 100 and the packaging subject, and then, the user may directly generate only the authentication information. The generated authentication information may be transmitted and stored to the controller of the entrance refrigerator 100 and the user's portable terminal. In this state, when the information of the delivery person is transmitted to the user's terminal, the user may transmit the authentication information to the terminal of the delivery person.

In summary, in the present invention, when the user orders the product and completes the payment, the encryption code and/or authentication information may be automatically generated or directly generated by the user, and the generated encryption code and/or authentication information may be transmitted to the controller of the entrance refrigerator 100, the packaging box of the ordered product, and the terminal 30 of the delivery person through the set method and path.

The present invention discloses that the method of transmitting the encryption code and/or authentication information to the entrance refrigerator 100, the packaging box of the ordered product, and the terminal 30 of the delivery person, but is not limited to any one.

Figure 18:
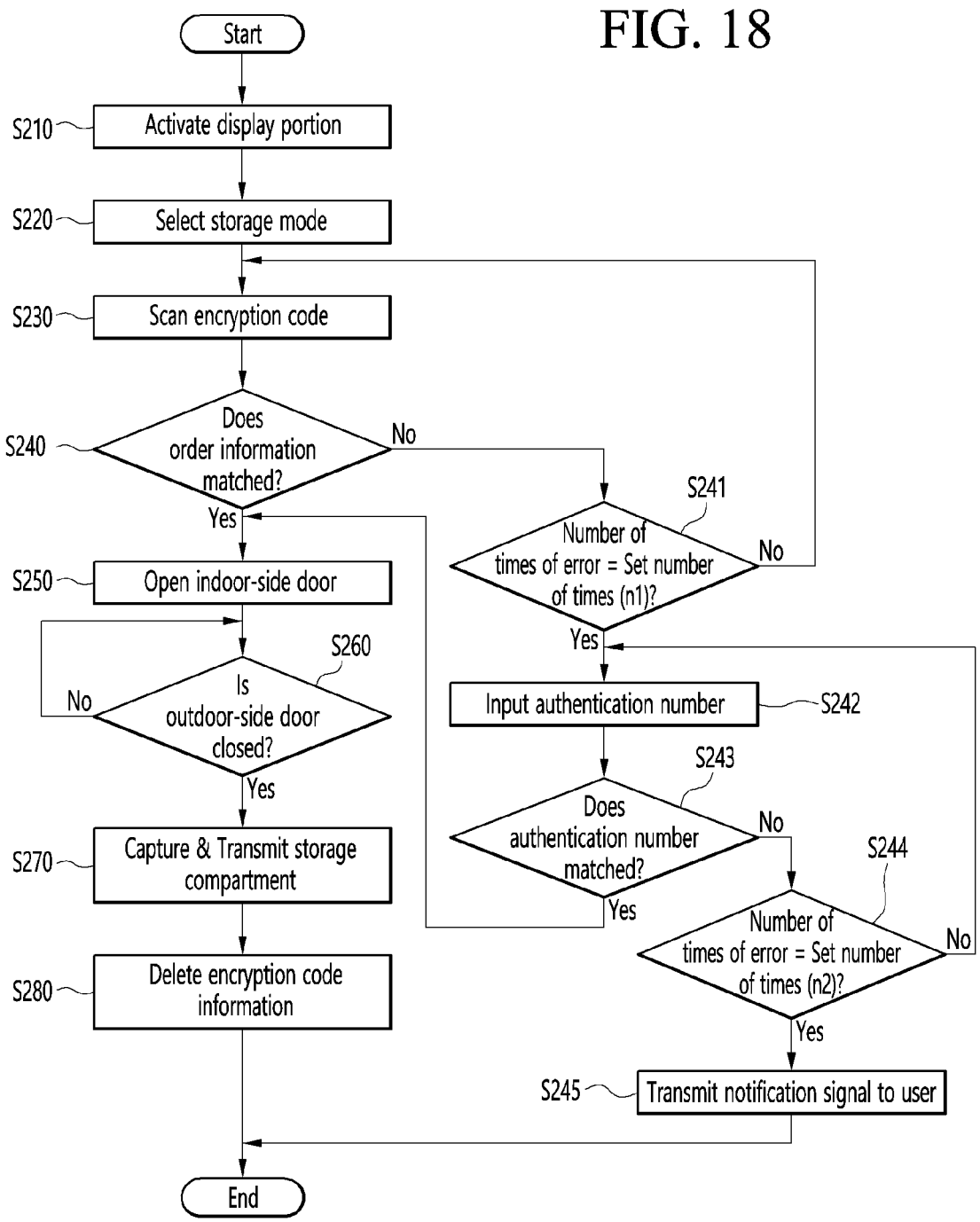
FIG. 18 is a flowchart illustrating a method for storing ordered goods in the entrance refrigerator according to an embodiment of the present invention.

FIG. 18 is a flowchart illustrating a method for storing ordered product in the entrance refrigerator according to an embodiment of the present invention.

The control method illustrated in FIG. 18 assumes that the encryption code and authentication information containing the information on the product ordered by the user are transmitted to the controller 500 of the entrance refrigerator 100 and stored in the memory or the server.

Referring to FIG. 18, first, in order for the delivery person to store the ordered product in the storage compartment 110a of the entrance refrigerator 100, the door 180 on the outdoor-side of the entrance refrigerator 100 has to be opened.

In order to open the outdoor-side door 180, the display portion 150 provided on the front surface of the outdoor-side door 180 has to be activated (S210) to input the encryption code or authentication information.

In detail, the method for activating the display portion 150 includes any one of a method in which the user knocks the screen of the display portion 150 with a hand at least once or a method in which the user touches the screen of the display portion 150 with a hand.

Alternatively, when the proximity sensor 531 provided at any side of the outdoor-side door 180 including the display portion 150 detects the approach of the delivery person, it is also possible to automatically activate the display portion 150.

Alternatively, when the proximity sensor 531 detects the approach of the delivery person, the camera provided on the front surface of the outdoor-side door 180 capture the delivery person, and the captured image information is transmitted to the controller 500. If the controller 500 analyzes the captured image to determine that it is the delivery person, the display portion 150 may be activated.

As an example, through the image analysis, if it is determined that the mark, emblem, or logo engraved on the clothes or hat of the delivery person matches the delivery subject information stored in the memory or the server, the display portion 150 may be activated.

Once, when the display portion 150 is activated, the delivery person touches the touch input portion displayed on the screen, specifically, a "storage mode" image to select the "storage mode" (S220). If there is no touch operation on the screen of the display portion 150 for inputting a command including the "storage mode" within a set time from a time point at which the display portion 150 is activated, the display portion 150 is controlled to return to the inactive state.

When the storage mode is selected, the controller scans the encryption code (S230) and performs a process of determining whether the order information matches (S240).

In detail, a command for bring the encryption code printed or attached to the packaging box to the code scanner 595 on the screen of the display portion 150 may be displayed in the form of text or a moving picture.

Alternatively, the command may be output in the form of a voice signal through the speaker 582 mounted at one side of the outdoor-side door 180 or one side of the cabinet portion protruding to the outside.

When the encryption code in the form of the barcode or QR code read from the code scanner 595 is transmitted to the controller 500, the controller uploads the encryption code information stored in the memory or server to compare with the encryption code information transmitted from the code scanner 595.

When it is determined that the order information stored in the memory or server matches the order information planted in the scanned encryption code, the controller 500 releases the lock state of the door lock 570 of the outdoor-side door 180 (S250). At this time, the outdoor-side door 180 may rotate slightly forward to be opened, and a signal indicating the opening of the outdoor-side door 180 may be output in the form of any one of a text, a video, or a voice signal.

Here, a scanning error in which the code scanner 595 does not scan the encryption code may occur because the encryption code printed or attached to the packaging box is damaged during the transportation. In this case, the controller 500 may output a command requesting to perform an operation for scanning the encryption code again in the form of the text or video on the display portion 581 or output in the form of the voice signal through the speaker 582.

Then, when the delivery person recognizes the command to re-perform the scanning operation, the operation of bringing the encryption code printed or attached to the packaging box close to the code scanner 595 will be performed again.

Nevertheless, an error that the code scanner 595 does not recognize the encryption code may still occur. When the number of scanning errors reaches the set number of times n1 (S241), the controller 500 may stop the scanning operation and perform another type of authentication process.

Specifically, in the controller 500, when the number of scanning errors reaches the set number of times n1, a command required to input the authentication number, which is generated and transmitted together with the encryption code to the memory or server of the entrance refrigerator 100 and the terminal 30 of the delivery person may be displayed on the display portion.

The authentication number input command may be output to the delivery person in the form of any one of the text, the video, and the voice, and an image of a number button for inputting an authentication number may be displayed on the screen of the display portion 581.

In this situation, the delivery person inputs the authentication number of the product stored in his terminal (S242), and when the input authentication number matches the authentication number stored in the memory or server of the entrance refrigerator 100 (S243), the outdoor-side door is opened.

On the other hand, when an error occurs due to mismatch of the authentication number in the authentication number input process, when the number of errors reaches the set number of times n2 (S244), the authentication number input process may be forcibly terminated, and a notification signal may be transmitted to the user's computer 10 or the mobile device 20 (S245).

When the authentication number input process is forcibly terminated, guide information indicating that the opening of the outdoor-side door has failed due to the mismatch of the authentication number, etc., and guide information directing direct contact with the user may be output on the screen of the display portion 581 in the form of the text or video or output through the speaker 582 in the form of the voice.

The operations S230 to S250 are an authentication procedure performed by the delivery person to open the door before the delivery person puts the ordered product into the storage compartment 110a and may be defined as a so-called "incoming authentication procedure". The encryption code and authentication number may be defined as "incoming authentication information".

On the other hand, when the encryption code scanning or authentication number identification procedure is successfully performed, and the outdoor-side door 180 of the entrance refrigerator 100 is opened, the delivery person puts the delivered product in the storage compartment 110a to store the delivered product in the outdoor-side door 180.

Here, when the outdoor-side door 180 is opened, the opening of the indoor-side door 170 may be restricted.

In detail, when the user allows the indoor-side door 170 to be opened from the inside in a state in which the outdoor-side door 180 is opened, it is possible to check the indoor space from the outdoors, and it also increase the likelihood that users will be exposed to the risk of crime.

In addition, when the product is delivered at dawn or at night, it may be desirable in terms of protecting the user's privacy in a case in which the user and the delivery person do not face each other. Thus, to prevent the indoor-side door 170 from being opened when the outdoor-side door 180 is opened, the controller 500 may control the door lock of the indoor-side door 170 to maintain the locked state. This is equally applied even when the indoor-side door 170 is opened, so that the opening of the outdoor-side door 180 is restricted.

On the other hand, when the delivery person stores the delivered product in the storage compartment 110a to close the outdoor-side door 180 (S260), the image capturing portion 592, that is, the camera 118, mounted on the storage compartment 110a, may be controlled to photograph the inside of the storage compartment 110a to transmit the captured image to the user's computer 10 or the mobile device 20 (S270).

Alternatively, it does not exclude that only a text message notifying that the delivered product is stored in the storage compartment 110a to the user's mobile device 20 is transmitted, or that the text message and image information are transmitted together.

The user may check the internal image information of the storage compartment, which is transmitted from the controller 500 to determine a situation inside the storage compartment 110*a*. For example, the user may easily determine how many delivered products are currently stored and how much free space exists through the image information.

Here, when the storage compartment 110*a* is filled with the delivered product, and sufficient space for additionally storing the delivered product is not secured in the storage compartment 110*a*, the controller 500 may transmit a notification signal to the user's computer 10 or the mobile device 20.

In this state, when the delivery person activates the display portion to store the article, the storage button may not be displayed on the display portion, but only the pickup button may be displayed.

In addition, the notification signal may be transmitted to the user's computer 10 or mobile device 20 when a movement of a person is detected by the proximity sensor 531 provided at the front side of the indoor-side door 170 or the cabinet 110.

In addition, when the outdoor-side door is closed (S260), the encryption code information and authentication information used to open the outdoor-side door are either deleted, initialized, or reset in the memory or server to prevent reuse (S280).

If the reuse of the encryption code is enabled, possibility that the unauthorized person by copying the encryption code opens the outdoor-side door 180 to steal the articles stored in the storage compartment 110*a* is not excluded. Therefore, it is preferable to limit the encryption code and authentication information to one-time use.

As another embodiment, it is also possible to omit the encryption code scanning process, and to perform the authentication number input process (operation S242 or below) immediately when entering the storage mode. In this case, generation of a separate encryption code will be omitted in the product ordering process, and only an authentication number will be generated.

On the other hand, when the opening of the indoor-side door 170 is detected while the delivery person selects the storage mode to the incoming authentication procedure, the controller 500 may interrupt and cancel the incoming authentication procedure prevent the outdoor-side door 180 from being opened.

In addition, after the incoming authentication procedure is stopped or canceled, when detecting the closing of the indoor-side door 170, the controller 500 may control the incoming authentication procedure to be resumed.

The resumption of the incoming authentication procedure may be understood to include a method to start again from a storage mode selection process (S220), and a method to continue the process after the time point at which the incoming authentication procedure is stopped.

Figure 19:
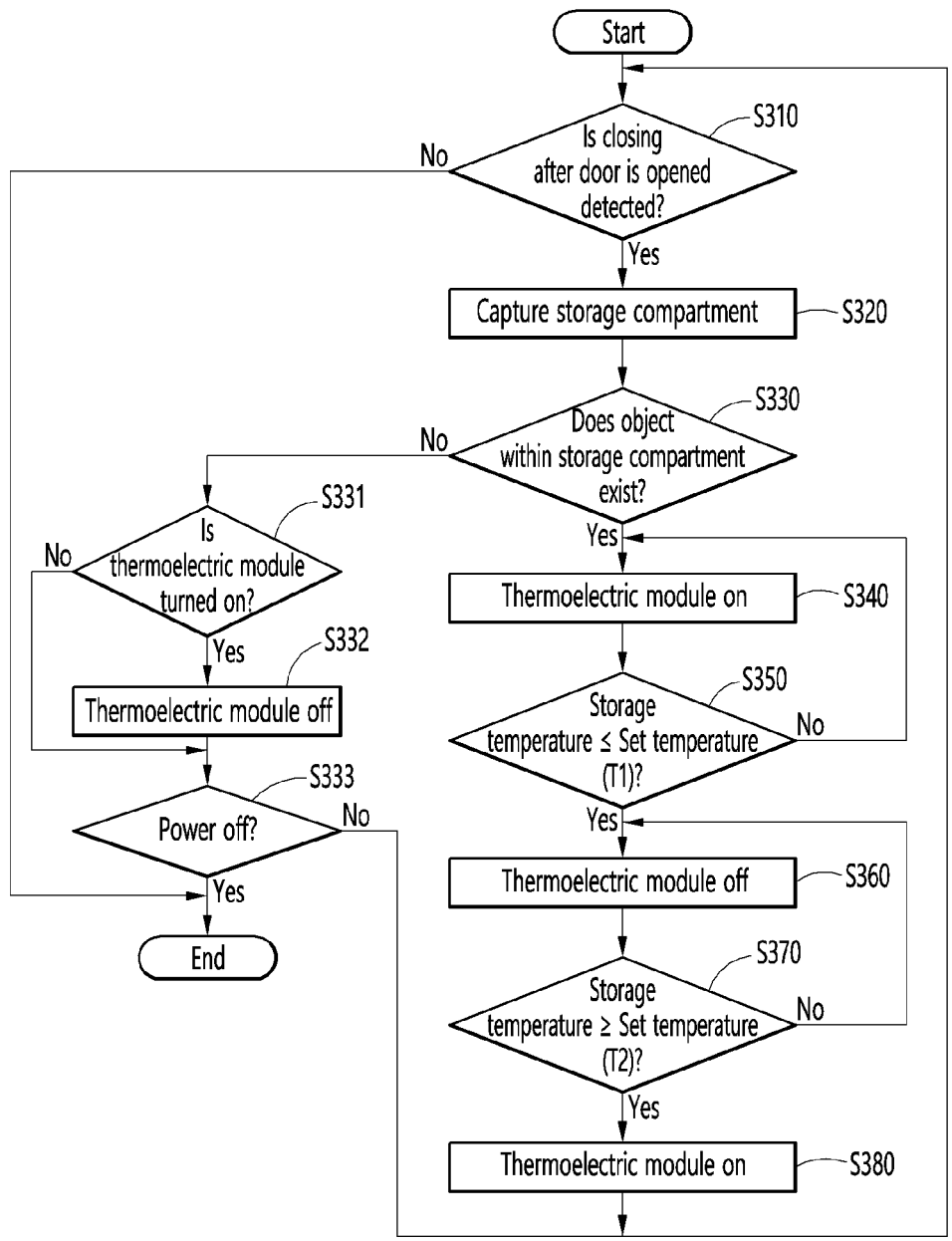
FIG. 19 is a flowchart illustrating a method for controlling a temperature of a storage compartment in which a delivery article is accommodated in the entrance refrigerator according to an embodiment of the present invention.

FIG. 19 is a flowchart illustrating a method for controlling a temperature of the storage compartment in which the delivery article is accommodated in the entrance refrigerator according to an embodiment of the present invention.

Referring to FIG. 19, when the controller 500 detects that the outdoor-side door 180 is opened and then closed (S310), the controller 500 controls the camera 118 to capture the inside of the storage compartment 110*a* (S320). The captured image is analyzed by the controller 500 to determine whether an object exists in the storage compartment 110*a* (S330).

If it is determined that there is an object in the storage compartment, power is applied to the thermoelectric element module 200 and turned on (S340). Then, the cold sink 230 of the thermoelectric element module 200 is cooled, and the storage compartment 110*a* is cooled to a set temperature.

In addition, the internal temperature of the storage compartment 110*a* is detected by the temperature sensor 534 provided in the storage compartment 110*a*, and it is determined whether the storage compartment temperature is cooled to a preset temperature T1 or less (S350).

When the storage compartment temperature is cooled to the set temperature T1, that is, a satisfactory temperature, the power supply to the thermoelectric element module 200 is cut off and controlled to be turned off (S360). However, the temperature sensor 534 is controlled to detect the temperature of the storage compartment 110*a* at regular intervals to transmit the detected temperature information to the controller 500.

In the controller 500, it is determined whether the storage compartment temperature has risen above the set temperature (T2), and when it is determined that the storage compartment temperature has risen above the set temperature (T2), that is, the unsatisfactory temperature, the thermoelectric element module is controlled to be turned on again (S380).

As the result of the image analysis, if it is determined that there is no object in the storage compartment, the controller 500 determines whether the current thermoelectric element module 200 is in an on state (S331), and when the thermoelectric element module 200 is in the on state, the power supply to the thermoelectric element module 200 is cut off to be turned off (S332).

As described above, the on/off control of the thermoelectric element module 200 according to the temperature of the storage compartment 110*a* may be continuously repeated unless the power of the entrance refrigerator 100 is turned off (S333).

Figure 20:
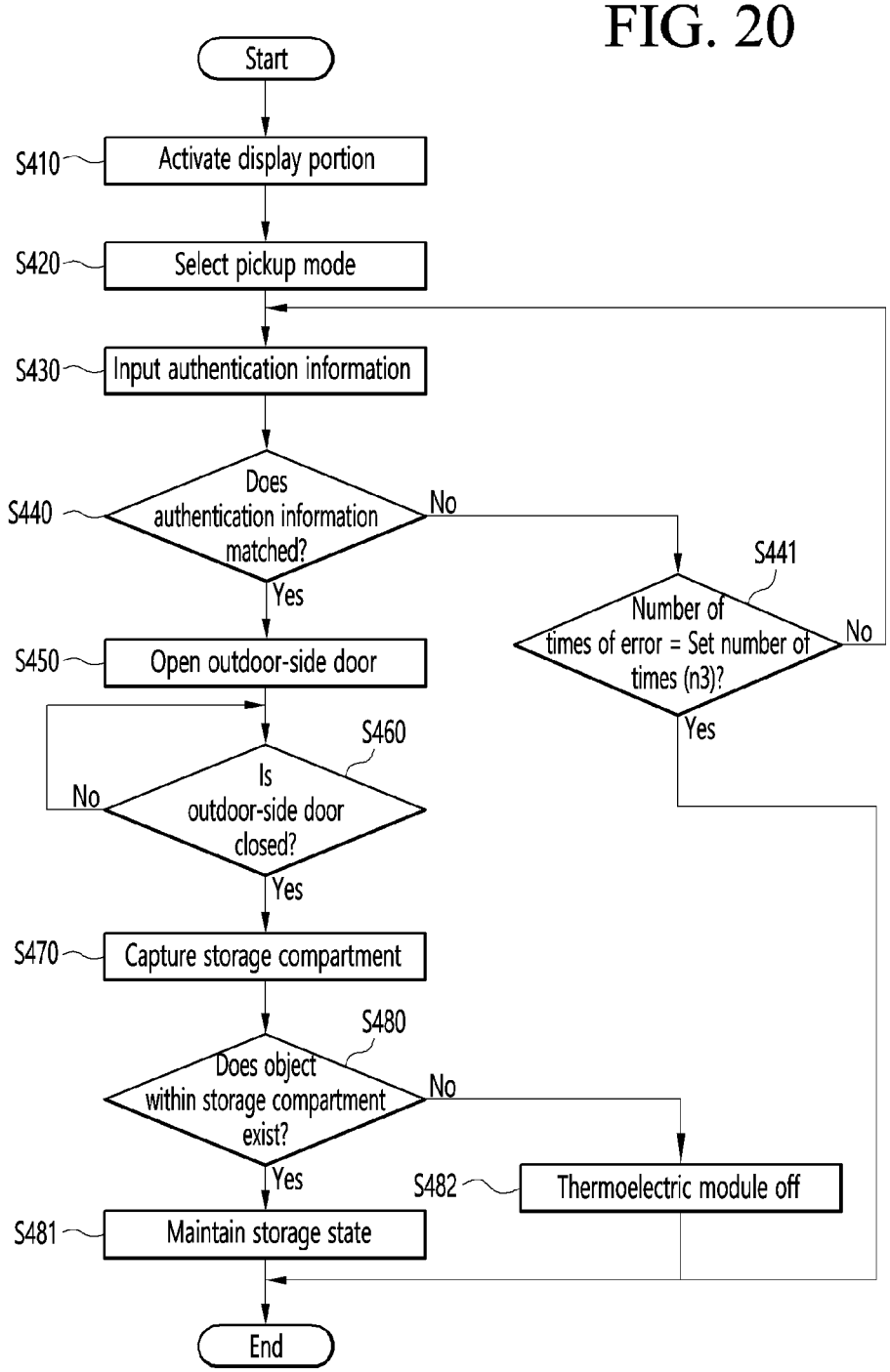
FIG. 20 is a flowchart illustrating a method of taking out delivered ordered goods from the entrance refrigerator according to an embodiment of the present invention.

FIG. 20 is a flowchart illustrating a method of taking out delivered ordered goods from the entrance refrigerator according to an embodiment of the present invention.

Referring to FIG. 20, the ordered product outgoing process is a procedure performed by the orderer who ordered the product, that is, the user, and is performed when the user wants to open the outdoor-side door from the outside instead of the opening the indoor-side door 170 from the inside.

The article stored in the storage compartment 110*a* are generally taken out by opening the indoor-side door 170 at the indoor space, but in some cases, the article may be taken out by opening the outdoor-side door 180.

For example, when a mother orders fresh food including milk or snacks for her child, which is stored in the storage compartment 110*a*, the child returning home from the school may take the ordered food out at the outdoor space without entering the house and move immediately at an academy or other place.

In detail, the user touches the display portion 581 of the outdoor-side door 180 to activate the display portion (S410).

As the method of activating the display portion, as described in operation S210 of FIG. 18, the display portion may be activated through an operation of touching or knocking the display portion 581 or a face recognition method by the image capturing portion 592.

When the display portion 581 is activated, the button image for selecting a "pickup mode" is displayed on the display portion screen, and the user proceeds to the next process by touching a "pickup mode" button image (S420).

When the pickup mode is selected, a guide text prompting to input the authentication information is output on the screen of the display portion 581, and a guide voice may be output through the speaker (S430).

Here, the authentication information includes a password set by the user. Thus, a figure pad image for inputting the password is displayed on the screen, as described in operation S242 of FIG. 18.

The authentication information may further include at least one of a user's face photo, fingerprint information, iris information, and vein map information, in addition to the password. The authentication information may be defined as "outgoing authentication information", and may be understood to be a different type of information from the incoming authentication information defined in FIG. 18.

In order to use the authentication information as a means for user recognition, a face recognition camera or a biometric sensor has to be installed in the outdoor-side door 180.

When it is determined that the authentication information input by the user, that is, the password matches the authentication information stored in the memory or the server (S440), the outdoor-side door 180 is controlled to be opened (S450).

On the other hand, if an error in which the authentication information does not match occurs, as described in FIG. 18, the authentication information input process may be repeatedly performed until the number of times of errors reaches the set number of times n3 (S441). If the number of times of errors exceeds the set number of times n3, the controller 500 may end the process of opening the outdoor-side door.

Before terminating the opening of the outdoor-side door, a message guiding to open the indoor-side door and take out an article may be output through the display portion or the speaker together with the guide message indicating that the authentication information does not match. Furthermore, it is also possible to output a message guiding the reset of the authentication number.

The operations S430 to S450 may be authentication procedures performed by the user to open the door before taking out the article stored in the storage compartment 110a and may be defined as a so-called "outgoing authentication procedure".

After the outdoor-side door is opened, the controller determines whether the outdoor-side door is closed (S460).

Whether the outdoor-side door is closed may be determined through a signal transmitted from the door opening/closing sensor of the refrigerator, and this is possible when the door opening/closing sensor widely used in the refrigerator is installed on the outdoor-side door 180. Thus, the sensor portion 530 illustrated in FIG. 16 may further include an opening/closing sensor for the outdoor and indoor-side doors.

In the state in which the outdoor-side door is opened, as described above, the opening of the indoor-side door may be restricted, and the opening of the outdoor-side door may be restricted in the opened state of the indoor-side door.

When it is determined that the outdoor-side door is closed, the camera 118 in the storage compartment 110a captures a space inside the storage compartment (S470), and the captured information is controlled to be transmitted to the controller 500.

The controller 500 analyzes the transmitted image inside the storage compartment to determine whether an object exists in the storage compartment (S480).

If it is determined that the object exists in the storage compartment, the thermoelectric element module 200 is maintained in the on state to maintain the previous storage state (S481).

On the other hand, if it is determined that the storage compartment is empty, the thermoelectric element module 200 may be turned off (S482).

Figure 21:
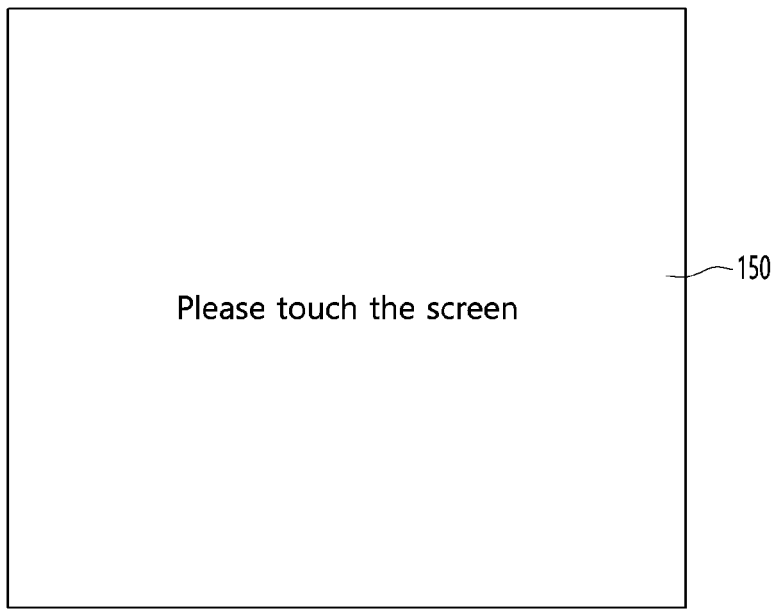
FIG. 21 is a view illustrating a state in which a display portion provided on an outdoor-side door is activated.

FIG. 21 is a view illustrating a state in which a display portion provided on an outdoor-side door is activated.

Referring to FIG. 21, the display portion 150 provided in the outdoor-side door 180 does not display any information on the screen before being activated, or only guide text to touch the screen to activate the screen may be displayed, as illustrated in the drawings.

Figure 22:
FIG. 22 is a view illustrating a state in which the display portion of the outdoor-side door is activated.

FIG. 22 is a view illustrating a state in which the display portion of the outdoor-side door is activated.

Referring to FIG. 22, when the delivery person touches or knocks the screen of the display portion 150 to activate the display portion 150, various information may be displayed on the screen.

Specifically, an image or video with the meaning of welcoming the delivery person's approach may be displayed on a center of the screen.

Also, text information indicating the number of the house to which the delivery person intends to deliver the ordered product may be displayed on a lower end of the image or video.

In addition, the text or image information indicating the current opened/closed state of the outdoor-side door 180 may be displayed on one edge of the screen of the display portion. A lock image and a LOCK character are displayed on an upper left corner of the display portion, and it is seen that the outdoor-side door 180 is currently in a locked state based on this information.

In addition, text or image information showing the current temperature inside the storage compartment 110a and/or an operating state of the thermoelectric module element installed for cooling the storage compartment 110a may be displayed on the other edge of the screen of the display portion.

A light-colored thermometer and an OFF character are displayed on an upper right corner of the display portion, and it is seen that the thermoelectric element module is in an OFF state because the current storage compartment is empty, based on this information.

In addition, the button image for selecting a "storage mode" may be displayed on a lower end of the screen of the display portion 150.

Figure 23:
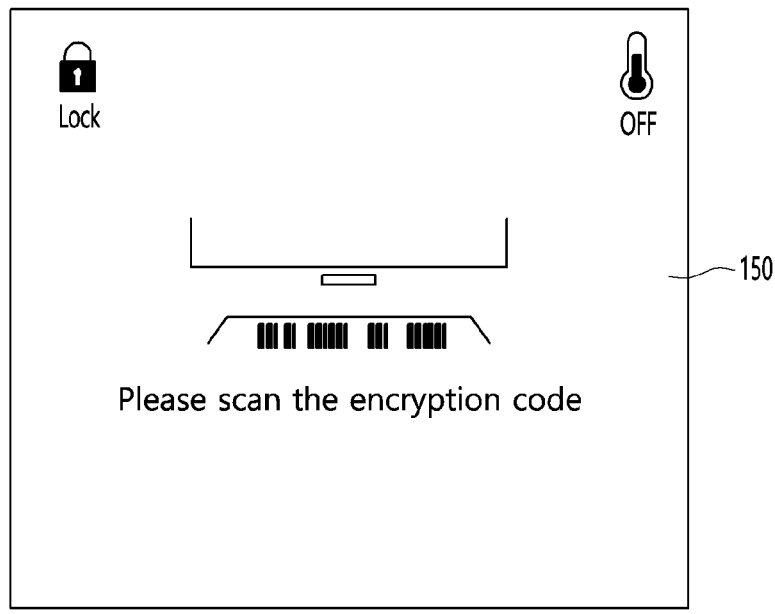
FIG. 23 is a view illustrating a screen of the display portion output in an encryption code scanning process.

FIG. 23 is a view illustrating a screen of the display portion output in an encryption code scanning process.

Referring to FIG. 23, a guide image or moving picture may be displayed on the screen of the display portion together with a guide text for scanning the encryption code by bringing the encryption code printed or attached to the packaging box to the code scanner.

In this state, the guide voice may be output together through the speaker 582.

Figure 24:
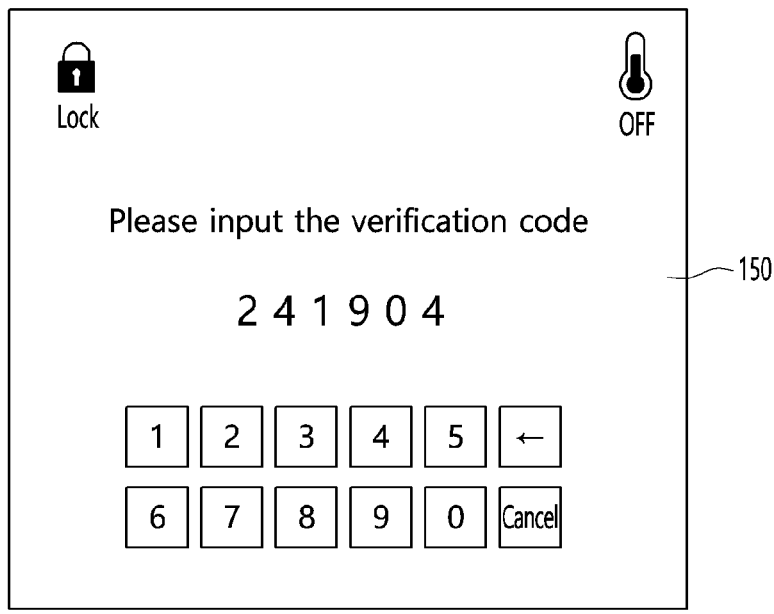
FIG. 24 is a view showing a screen of the display portion output in a process of inputting an authentication number when an encryption code scanning error occurs.

FIG. 24 is a view showing a screen of the display portion output in a process of inputting an authentication number when an encryption code scanning error occurs.

Referring to FIG. 24, a keypad image for inputting a figure and a figure display box in which a touched number is displayed may be displayed on the screen of the display portion.

The same screen may be displayed in the authentication number or password input process performed by the user in the pickup mode to take out the article.

Figure 25:
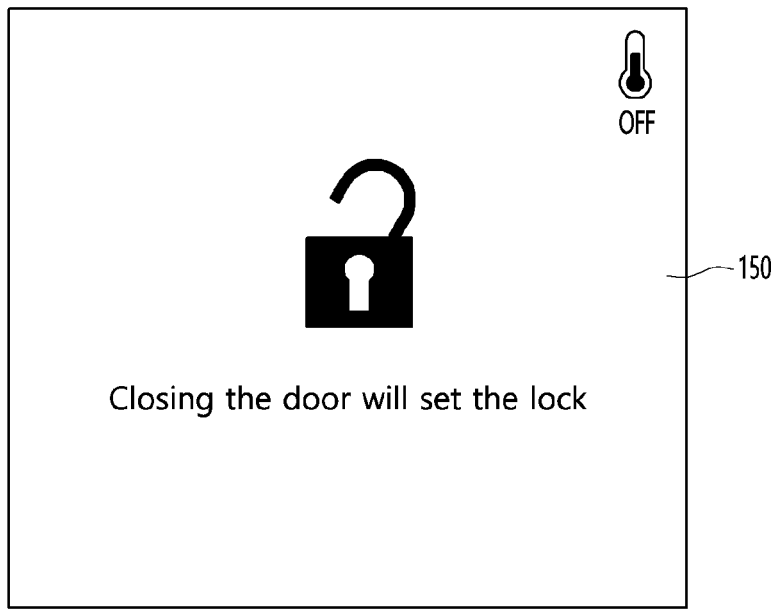
FIG. 25 is a view illustrating a screen of the display portion output when the encryption code scanning is successful.

FIG. 25 is a view illustrating a screen of the display portion output when the encryption code scanning is successful.

Referring to FIG. 25, when the encryption code scanning or authentication number input is successfully performed, the image or video indicating that the lock state of the outdoor-side door 180 is released may be displayed on the center of the screen as illustrated in the drawings.

In addition, it is possible to display the guide message on the lower side of the screen indicating that the door is returned to the locked state when the door is closed.

In addition, in this process, a voice message indicating that the outdoor-side door has been opened may be output through the speaker.

Figure 26:
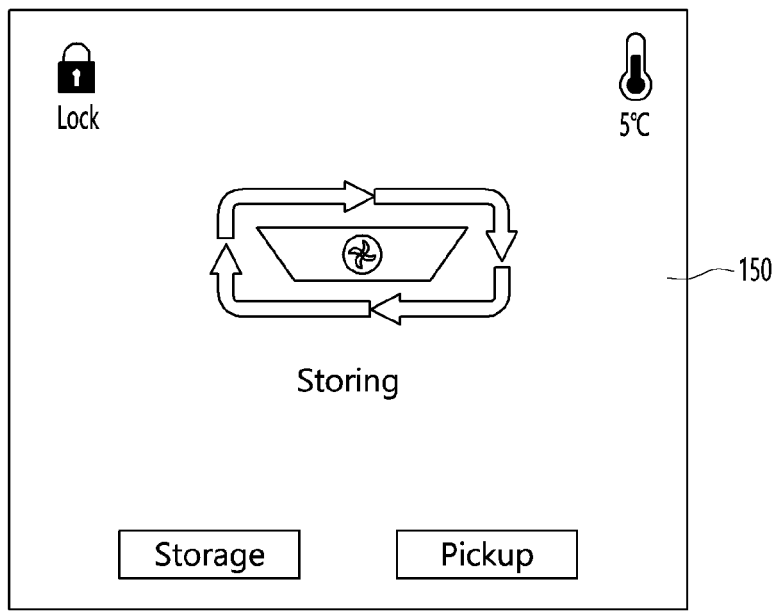
FIG. 26 is a view illustrating a screen of the display portion when a user or a delivery person activates the display portion in a state in which an article is stored in the storage compartment of the entrance refrigerator.

FIG. 26 is a view illustrating a screen of the display portion when a user or a delivery person activates the display portion in a state in which an article is stored in the storage compartment of the entrance refrigerator.

Referring to FIG. 26, when the delivery article (or product) is being stored in the storage compartment 110a, the thermometer image may be activated on one side of the screen as a method for notifying that the thermoelectric element module 200 is in the on state.

In addition, the temperature inside the storage compartment may be displayed numerically under the thermometer image.

In addition, an image of a locked shape may be displayed on the other side of the display portion screen to inform that the outdoor-side door 180 is currently in the locked state.

Also, an image or a video indicating that the article is currently being stored may be output on the center of the screen.

Also, a button image for selecting any one of "storage mode" and "pickup mode" may be displayed on the lower end of the screen. Although it is possible to display only the button image for entering the "pickup mode" when the article is being stored, there may be a situation in which another delivery person stores other articles even when the article is in storage, and thus, it is possible to display all the button image for the pickup mode and the button image for the storage mode.

Figure 27:
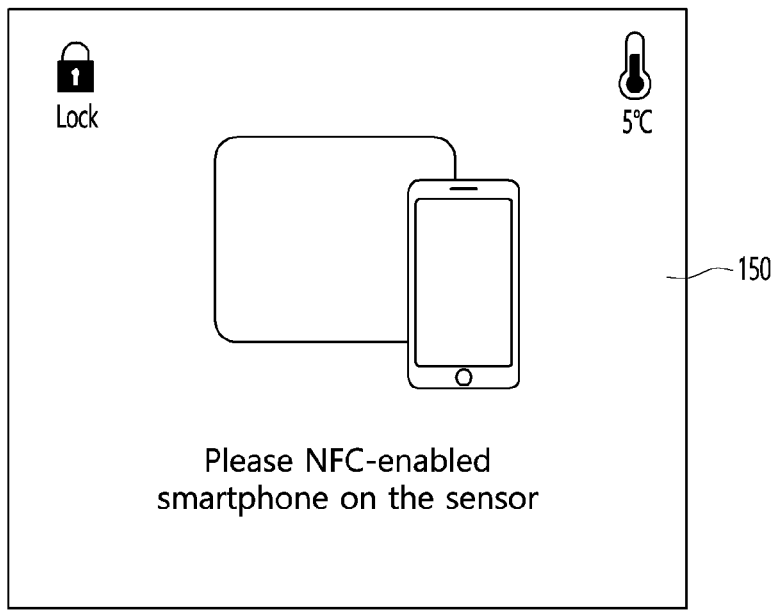
FIG. 27 is a view illustrating a screen of the display portion in the authentication process performed by the user to pickup the stored article.

FIG. 27 is a view illustrating a screen of the display portion in the authentication process performed by the user to pickup the stored article.

Referring to FIG. 27, in order to allow the user to pickup the article stored in the storage compartment 110a, the password or authentication number has to be input, or the user authentication procedure has to be performed using other biometric information or the user's mobile device 20.

As an example, the user authentication may be performed by bringing the user's mobile device 20 equipped with a near field communication module to the center of the screen.

As illustrated in the drawings, the display portion may display the guide text and the image for the user authentication by bringing the user's mobile device, on which the near field communication module is turned on, to the screen of the display portion.

In addition to this method, various biometric information recognition methods such as fingerprint recognition, iris recognition, or vein recognition may be applied.

Figure 28:
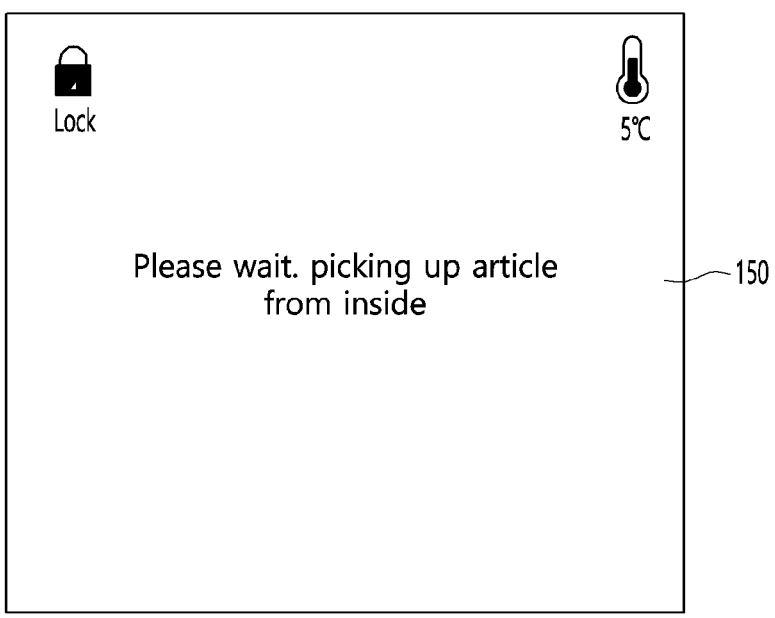
FIG. 28 is a view illustrating a screen of the display portion of the outdoor-side door in a state in which the user is taking out an article in an indoor space.

FIG. 28 is a view illustrating a screen of the display portion of the outdoor-side door in a state in which the user is taking out an article in an indoor space.

Referring to FIG. 28, as described above, while the user opens the indoor-side door 170 to take out the article stored in the storage compartment 110a, the opening of the outdoor-side door 180 is restricted.

In this case, the display portion 150 may display a message guiding that the opening of the outdoor-side door is temporarily limited because the indoor-side door is currently opened.

Here, if it is determined that notifying the delivery person that is in the situation in which the indoor-side door is opened is not appropriate in terms of security, only the guide message to simply wait for a while may be output.

What is claimed is:

1. A refrigerator comprising:
a cabinet installable at a door or a wall, the cabinet having a storage compartment to store an article;
an outdoor-side door connected to a front surface of the cabinet to open or close the storage compartment;
an input portion disposed at one side of the outdoor-side door or the cabinet, the input portion being provided to input information therethrough;
a controller configured to control the input portion so that, when a set condition is satisfied, the input portion is activated so that the input of the information is enabled, and when another set condition is satisfied, the input portion is inactivated; and
a cold air supply device disposed in the cabinet, the cold air supply device to supply cold air to the storage compartment,
wherein the cold air supply device comprises:
a thermoelectric element;
a cold sink that is in contact with a heat absorption surface of the thermoelectric element;
a heat sink that is in contact with a heat generation surface of the thermoelectric element;
a cold air circulation fan disposed at a side of the cold sink to cause air of the storage compartment to forcibly flow so that the air of the storage compartment is heat-exchanged with the cold sink; and
a heat dissipation fan disposed at a side of the heat sink to cause the outside air to forcibly flow so that the outside air is heat-exchanged with the heat sink,
wherein the controller is configured to:
perform incoming authentication for releasing a lock state of the outdoor-side door when incoming authentication information is received through the input portion by matching with pre-stored incoming reference information, in a state in which the input portion is activated, and
perform of any one of deletion, initialization, or reset of the pre-stored reference information when the lock state of the door is released.

2. The refrigerator according to claim 1, wherein the controller is configured to perform outgoing authentication for releasing the lock state of the outdoor-side door when outgoing authentication information is received through the input portion by matching with pre-stored outgoing reference information,
wherein the incoming authentication and the outgoing authentication are performed by different methods.

3. The refrigerator according to claim 2, wherein the incoming reference information and the outgoing reference information are set differently.

4. The refrigerator according to claim 2, wherein the incoming reference information comprises information related to incoming goods.

5. The refrigerator according to claim 4, wherein the incoming reference information comprises at least one of barcode information or QR code information of the incoming goods.

6. The refrigerator according to claim 2, wherein the outgoing reference information comprises user's information registered in relation to the refrigerator.

7. The refrigerator according to claim 6, wherein the outgoing reference information comprises at least one of NFC information of the registered user's mobile phone or user's biometric information.

8. The refrigerator according to claim 2, wherein the input portion comprises:
   a first input portion to input the incoming authentication information; and
   a second input portion to input the outgoing authentication information,
   wherein the first input portion and the second input portion are distinguished from each other.

9. The refrigerator according to claim 8, wherein the first input portion comprises a code scanner to scan an encryption code, and
   the second input portion comprises at least one of:
   a biometric sensor to recognize a user's biometric information; or
   a near-field communication module to recognize a user's mobile device.

10. The refrigerator according to claim 2, wherein the input portion comprises:
    a first input portion to input the incoming authentication information; and
    a second input portion to input the outgoing authentication information,
    wherein an activation of the first input portion and an activation of the second input portion are different from each other.

11. The refrigerator according to claim 10, wherein, when it is the controller determines that the storage compartment is empty, the first input portion is activated.

12. The refrigerator according to claim 10, wherein, when it is the controller determines that the article exists in the storage compartment in excess of a preset reference amount, the second input portion is activated.

13. The refrigerator according to claim 2, wherein the input portion comprises:
    an incoming mode to input information for incoming; and
    an outgoing mode to input information for outgoing.

14. The refrigerator according to claim 13, wherein the incoming mode comprises a storage button, and
    the outgoing mode comprises a pickup button.

15. The refrigerator according to claim 13, wherein the controller is configured to activate only the incoming mode when the set condition is satisfied.

16. The refrigerator according to claim 15, wherein the controller determines that the set condition is satisfied when it is determined that the storage compartment is empty.

17. The refrigerator according to claim 13, wherein the controller is configured to activate only the outgoing mode when the set condition is satisfied.

18. The refrigerator according to claim 17, wherein the controller determines that the set condition is satisfied when it is determined that the article exists in the storage compartment.

19. The refrigerator according to claim 17, wherein the controller determines that the set condition is satisfied when it is determined that there is insufficient storage space in the storage compartment.

20. The refrigerator according to claim 2, further comprising an indoor-side door connected to a rear surface of the cabinet to open or close the storage compartment,
    wherein the controller is configured to control the outdoor-side door to be maintained in the lock state when the indoor-side door is opened.

21. The refrigerator according to claim 20, wherein the controller is configured to control an incoming authentication procedure:
    to be restricted in a state in which the indoor-side door is opened; and
    to be stopped when the indoor-side door is opened while the incoming authentication procedure is being performed.

22. The refrigerator according to claim 21, wherein the controller is configured to resume the incoming authentication procedure when the indoor-side door is closed.

23. The refrigerator according to claim 2, wherein the controller is configured to perform another type of incoming authentication when a set number of authentication error occurs, in which the incoming authentication information received through the input portion does not match with the pre-stored incoming reference information.

24. The refrigerator according to claim 2, wherein the controller is configured to perform another type of outgoing authentication when a set number of authentication error occurs, in which the outgoing authentication information received through the input portion does not match with the pre-stored outgoing reference information.

25. The refrigerator according to claim 1, wherein, when the controller determines that the article exists in the storage compartment, the controller is configured to operate the cold air supply device to maintain the storage compartment at a set temperature.

26. The refrigerator according to claim 25, further comprising an image capturing portion disposed at the storage compartment,
    wherein image information captured by the image capturing portion is transmitted to the controller, and
    the controller is configured to analyze the image information to determine whether the article exists in the storage compartment.

* * * * *